US012630989B2

(12) United States Patent
Iverson et al.

(10) Patent No.: US 12,630,989 B2
(45) Date of Patent: May 19, 2026

(54) SPREADER OR SPRAYER AND CONTROL SYSTEM THEREFORE

(71) Applicant: Douglas Dynamics, L.L.C., Milwaukee, WI (US)

(72) Inventors: Bob W. Iverson, Germantown, WI (US); Jeffery Scott De Ruyter, Cedar Grove, WI (US); Tucker Evans Hill, Hope, ME (US); Andrew Joseph Janowicz, Orland, ME (US); Jason Nathanael Sievert, West Bend, WI (US)

(73) Assignee: Douglas Dynamics, L.L.C., Milwaukee, WI (US)

( * ) Notice: Subject to any disclaimer, the term of this patent is extended or adjusted under 35 U.S.C. 154(b) by 416 days.

(21) Appl. No.: 18/189,352

(22) Filed: Mar. 24, 2023

(65) Prior Publication Data

US 2023/0304243 A1 Sep. 28, 2023

Related U.S. Application Data

(63) Continuation-in-part of application No. 18/172,851, filed on Feb. 22, 2023.

(Continued)

(51) Int. Cl.

*E01H 10/00* (2006.01)
*B01F 23/40* (2022.01)
*B01F 35/81* (2022.01)

(52) U.S. Cl.

CPC ........... *E01H 10/007* (2013.01); *B01F 23/49* (2022.01); *B01F 35/81* (2022.01)

(58) Field of Classification Search

CPC ........ E01H 10/007; B01F 23/49; B01F 35/81; B01F 35/82

See application file for complete search history.

(56) References Cited

U.S. PATENT DOCUMENTS 5,911,362 A 6/1999 Wood et al.
5,961,040 A * 10/1999 Traylor ................. E01C 19/201 239/69

(Continued)

FOREIGN PATENT DOCUMENTS

KR 20160090501 A * 8/2016 ........... E01H 10/007
KR 20200015116 A * 2/2020 ........ B01F 15/00831
WO WO-03004778 A1 * 1/2003 ........... E01H 10/007

OTHER PUBLICATIONS

PCT/US23/16117 Search Report and Written Opinion received Aug. 14, 2023.

(Continued)

*Primary Examiner* — Darren W Gorman

(74) *Attorney, Agent, or Firm* — Wood Herron & Evans LLP

(57) ABSTRACT

A vehicle mounted sprayer for spreading liquid treatment material for treatment or pre-treatment of road surfaces comprises a plurality of tanks for containing main brine material to be spread, a hot mix tank supplying hot mix, a mix valve for mixing the main brine and hot mix, pumps for controllably delivering main brine and hot mix to the mix valve, and a flow sensor for measuring the flow rate of liquid treatment material. A controller determines the intended density and flow rate of liquid based on sensor inputs.

11 Claims, 24 Drawing Sheets

Related U.S. Application Data

(60) Provisional application No. 63/269,947, filed on Mar. 25, 2022.

(56) References Cited

U.S. PATENT DOCUMENTS

| | | | | |
|---|---|---|---|---|
| 5,988,535 | A | 11/1999 | Kime | |
| 6,166,657 | A * | 12/2000 | Mann | B60B 39/086 340/580 |
| 6,938,829 | B2 * | 9/2005 | Doherty | E01C 19/21 239/69 |
| 8,275,522 | B1 | 9/2012 | Groeneweg et al. | |
| 8,583,333 | B2 | 11/2013 | Rennie et al. | |
| 8,799,520 | B2 | 8/2014 | Schelkle et al. | |
| 9,096,979 | B2 | 8/2015 | Larsen | |
| 9,194,091 | B2 | 11/2015 | Moon, Jr. et al. | |
| 9,278,645 | B1 | 3/2016 | Orazem | |
| 9,330,367 | B2 | 5/2016 | Larsen | |
| 9,864,957 | B2 | 1/2018 | Rennie et al. | |
| 10,275,724 | B2 | 4/2019 | Rennie et al. | |
| 10,577,766 | B2 * | 3/2020 | Isele | E01C 19/21 |
| 10,733,542 | B2 | 8/2020 | Rennie et al. | |
| 2004/0194353 | A1 | 10/2004 | Hoerle et al. | |
| 2007/0221749 | A1 * | 9/2007 | Zaharis | E01H 10/007 239/146 |
| 2011/0015832 | A1 | 1/2011 | Hoyle | |
| 2011/0017847 | A1 | 1/2011 | Truan et al. | |
| 2011/0278381 | A1 | 11/2011 | Aral | |
| 2014/0182637 | A1 | 7/2014 | Kim | |
| 2014/0231553 | A1 | 8/2014 | Truan et al. | |
| 2015/0053784 | A1 * | 2/2015 | Kime | E01H 10/007 239/662 |
| 2017/0342672 | A1 * | 11/2017 | Giovinazzo | B05B 12/085 |
| 2018/0044863 | A1 | 2/2018 | Gamble, II et al. | |
| 2019/0242069 | A1 | 8/2019 | Fennell et al. | |
| 2020/0071894 | A1 | 3/2020 | Coyne et al. | |
| 2020/0199836 | A1 | 6/2020 | Zhang et al. | |
| 2020/0298261 | A1 | 9/2020 | Mäenpää et al. | |
| 2022/0412029 | A1 | 12/2022 | Voigt et al. | |
| 2024/0060260 | A1 | 2/2024 | Kime et al. | |
| 2024/0061452 | A1 | 2/2024 | Voigt et al. | |

OTHER PUBLICATIONS

LMN Business Management Software, Mobile Software for Snow & Ice Contractors, Visit our Virtual Table, 23rd Annual Snow & Ice Symposium, 2020.

Aspire Software, Visit our Virtual Table, 23rd Annual Snow & Ice Symposium, 2020.

Hilltip North America, Hilltip Introduces HTrack(TM) Products Webpage; (https://hiltip.com/en/products/htrack/), 2017.

Certified Power Solutions, Home > Products > Snow and Ice Products product information, 2020.

Dickey—john(R), Flexr4 Pro(TM) Public Works Control System brochure, 2017.

Rexroth Bosch Group, Compu-Spread CS-550/150 Solids & Liquids Spreader/Joystick Controller datasheet; Oct. 2016.

Certified Cirus (TM) Control Systems, Precision controls for powerful spreader performance product information, 2017.

MTS Pro, Mini RWIS Product Webpage, https://mtspro.io/minirwis/, printed Apr. 2023.

AccuSalt Systems, Salt and Material Application Monitor Webpage, https://accusaltsystems.com, printed Apr. 2023.

Wessex International, PolarOne(TM) Salt and Grit Spreaders product webpage,https://www.wessexintl.com/machines/salt-spreader/trailer-spreaders/polarone-sale-and-grit-spreaders/, printed Apr. 2023.

Epoke A/S, Computer Assisted Spreading webpage, https://epoke.dk/home/products/technology/computer-assisted-spreading/, printed Apr. 2023.

Aebi Schmidt Group, Schmidt/Stratos 1.7-3.0 m3 product webpage, https://www.aebi=schmidt.com/en/products/schmidt/spreaders/stratos-1-7-3-0/, printed Apr. 2023.

* cited by examiner

SPREADER OR SPRAYER AND CONTROL SYSTEM THEREFORE

RELATED APPLICATIONS

This application claims the priority benefit of U.S. Provisional Patent Application No. 63/269,947 filed Mar. 25, 2022, and is a continuation-in-part of U.S. patent application Ser. No. 18/172,851 filed Feb. 22, 2023, which claims the priority benefit of U.S. Provisional Patent Application No. 63/269,947 filed Mar. 25, 2022, all of which are hereby incorporated by reference herein as if fully set forth in their entirety.

FIELD OF THE INVENTION

This invention relates generally to snow and ice control, and more particularly to spreaders and sprayers for spreading and spraying snow and ice melt materials onto snow and ice covered road surfaces.

BACKGROUND OF THE INVENTION

Spreaders for spreading salt or other granular chemicals for melting snow and ice on road surfaces, or for spreading abrasives such as sand for otherwise reducing the deleterious effects of snow and ice on road surfaces, are well known. As used herein, "road surface" or "paved surface" or simply "surface" shall embrace concrete, asphalt, tar-and-chip, gravel, and dirt surfaces. One type of spreader is mounted on or in a bed of a truck, has a hopper for containing the material to be spread, a spinner for spreading the material onto the pavement, and an auger or chain conveyor for moving the material from the hopper to the spinner.

Sprayers for spraying brine for melting snow and ice on road surfaces are also well known. One type of sprayer is mounted on or in a bed of a truck, has a tank for containing the brine to be sprayed, a nozzle array for spraying the brine onto the pavement, and a pump and hoses for moving the brine from the tank to a perforated hose or nozzle array to spray brine on the material being spread.

Snow and ice control professionals currently do not have precise control of the volume and area of the distribution of snow and ice control material, whether that material be a solid such as sand, salt, or granular snow/ice melt chemical, or a liquid such as salt brine or calcium chloride brine. Application is difficult to measure as it is influenced by many variables, chiefly the rate with which material is moved out of the hopper or liquid tank, the speed of the vehicle, and the pattern of the material distribution, which is typically controlled by the speed of the spinner and the position of deflectors, in the case of spreaders, and the position of liquid nozzles, in the case of sprayers.

Current processes are based on manually controlling these three variables and estimating results which lacks precision and is prone to over-applying, under-applying, or inconsistently applying material. Potential consequences include inadequate material coverage resulting in unsafe surfaces, excessive coverage resulting in wasted material, inaccurate customer billing, and violation of environmental standards or regulations. These consequences all present legal or financial risk for the operator.

In the case of brine spraying, the wrong application amount can make road conditions worsen. The lack of proper controls of application amount, brine concentration, and other factors has slowed the adoption of brine spraying for surface treatment.

These problems are magnified for the owners and managers of fleets of vehicles who must track the application of material for multiple vehicles with snow and ice control equipment that are operating simultaneously in multiple locations. The collection of data from these fleets is difficult, relies on imprecise estimates, and cannot be done in real-time. This presents complicated challenges to the efficient allocation of equipment and material, billing and quality assurance, and the tracking of equipment and job status.

Control and tracking of the application of de-icing material is currently primarily based on estimation and manual inputs. In some cases calibrated assumptions about material application are used for these estimates, which simplifies estimation but does not actually measure the material and is therefore not reliable, particularly as additional variables change. Furthermore, calibration is an undesirable process to the customer and fails to account for variables in the material or environment. Solutions to offer location information and improved connectivity also exist but are unable to provide the material usage data with the desired precision.

Accordingly, snow and ice control equipment and a control system therefore is desired that is capable of precisely controlling and tracking snow and ice melt material distribution, and facilitating real-time fleet management.

SUMMARY OF THE INVENTION

In one aspect, a vehicle mounted spreader for spreading materials such as sand, salt, or other granular chemicals onto snow- and ice-covered road surfaces comprises a hopper for containing the material to be spread, one or more load sensors coupled to the hopper for measurement of the hopper contents, a spinner for spreading the material, a conveyor for conveying the material from the hopper to the spinner, and a vehicle speed input, where the load sensor, spinner, conveyor, and speed input are coupled to a controller. The controller is programmed with an intended density of material (e.g., pounds per acre) and desired width of coverage; within the controller a vehicle speed measurement and load sensor inputs are processed to generate outputs to control the speed of the conveyor and spinner, to both control the rate of material distribution and the pattern of material distribution to approach the intended density and width.

In one particular embodiment, within the controller, an assumed output rate developed from a current spinner and conveyor rate is adapted using real-time load sensor readings, such that the controller refines the output rate and adjusts the speed of the conveyor toward the intended density of material. Further, the controller may actively control the speed of the spinner to achieve a desired width of coverage.

Further embodiments comprise a human interface, and the controller may provide feedback information via the human interface to an operator. The feedback information may include a range within which vehicle speed must be maintained to permit accurate control of the rate of material distribution at the target density.

In another aspect, a vehicle mounted sprayer for spreading liquid material such as brine comprises a main brine liquid tank, the output of which is controlled by a first pump, and a hot mix tank the output of which is controlled by a second pump, the first and second pumps delivering liquid brine to a mix valve where the brine and hot mix are combined. A flow meter and multiple valves control and measure the amount of mix delivered to the sprayers.

In one particular embodiment, within the controller, system pressure and flow rates are established by controlling brine recirculation using a proportioning valve, and a flow meter is included to measure the flow rate of deicing liquid including hot mix leaving the system, and verify the correct deicing application to the surface.

Some embodiments further comprise a wireless communication system, and the controller may be coupled to the wireless communication system to deliver feedback information from the controller to a remote server, from which it may be accessed by interested persons. The information provided may include historical measurements of coverage density and width of coverage, speed, and load sensor data. Vehicle speed may be obtained by the speed input from a vehicle diagnostics port and/or the controller may further comprise a positioning system producing location and motion information and deliver location and motion information to the speed input of the controller, the human interface and/or the remote server. The controller may also receive instructions from a dispatcher via the wireless communication system, for delivery to the human interface.

In one embodiment of the controlled mechanical system, the spreader can comprise a cradle supported by the vehicle, the cradle including at least one load cell serving as a load sensor, with the hopper supported by the at least one load cell. The conveyor can be an auger or a chain conveyor. In other embodiments within the scope of the present invention, the conveyor could be a belt conveyor.

In an embodiment of the controlled mechanical system for a sprayer, the main brine liquid tank comprises two or more brine liquid tanks positioned within a platform 204, and collectively supplying main brine liquid to the first pump.

In another aspect, a vehicle mounted apparatus for distributing snow and ice melt material onto snow- and ice-covered road surfaces comprises a container for containing the material to be distributed, means for distributing the material, means for conveying the material from the container to the means for distributing the material, and a controller controlling the distributing means and conveying means in response to a measurement of the quantity of melt material in the container, the controller programmed with an intended density of melt material (e.g., pounds per acre) and desired width of coverage; within the controller a vehicle speed sensor measurement and vehicle load sensor inputs are processed to generate outputs to control the speed of the conveyor and spinner, to both control the rate of material distribution and the pattern of material distribution to approach the intended density and width.

The apparatus can further comprise a cradle supported by the vehicle, the cradle having at least one load cell providing the load sensor input to the control system, the quantity of material in the container measured by at least one load sensor. The container can be a hopper, the material can be sand, salt, or other granular chemicals, the means for distributing the material can be a spinner, and the means for conveying the material can be an auger or a chain conveyor. Alternatively, the container can be a tank, the material can be brine, the means for distributing the material can be a nozzle array, and the means for conveying the material can be a pump and a hose, or a belt conveyor.

In another aspect, a vehicle mounted sprayer for delivery of treatment liquids comprises a deployable spray bar, supported by deployable arms from a rear of the truck having a lift gate, and positioning the deployable spray bar over the road surface to the rear of the truck. The deployable arms include a folding mechanism which, when folded, withdraw the spray bar to position adjacent the rear of the truck and above the truck lift gate for storage.

The accompanying drawings, which are incorporated in and constitute a part of this specification, illustrate embodiments of the invention and, together with the summary of the invention given above, and the detailed description of the drawings given below, serve to explain the principles of the present invention.

DETAILED DESCRIPTION OF THE DRAWINGS

Figure 1:
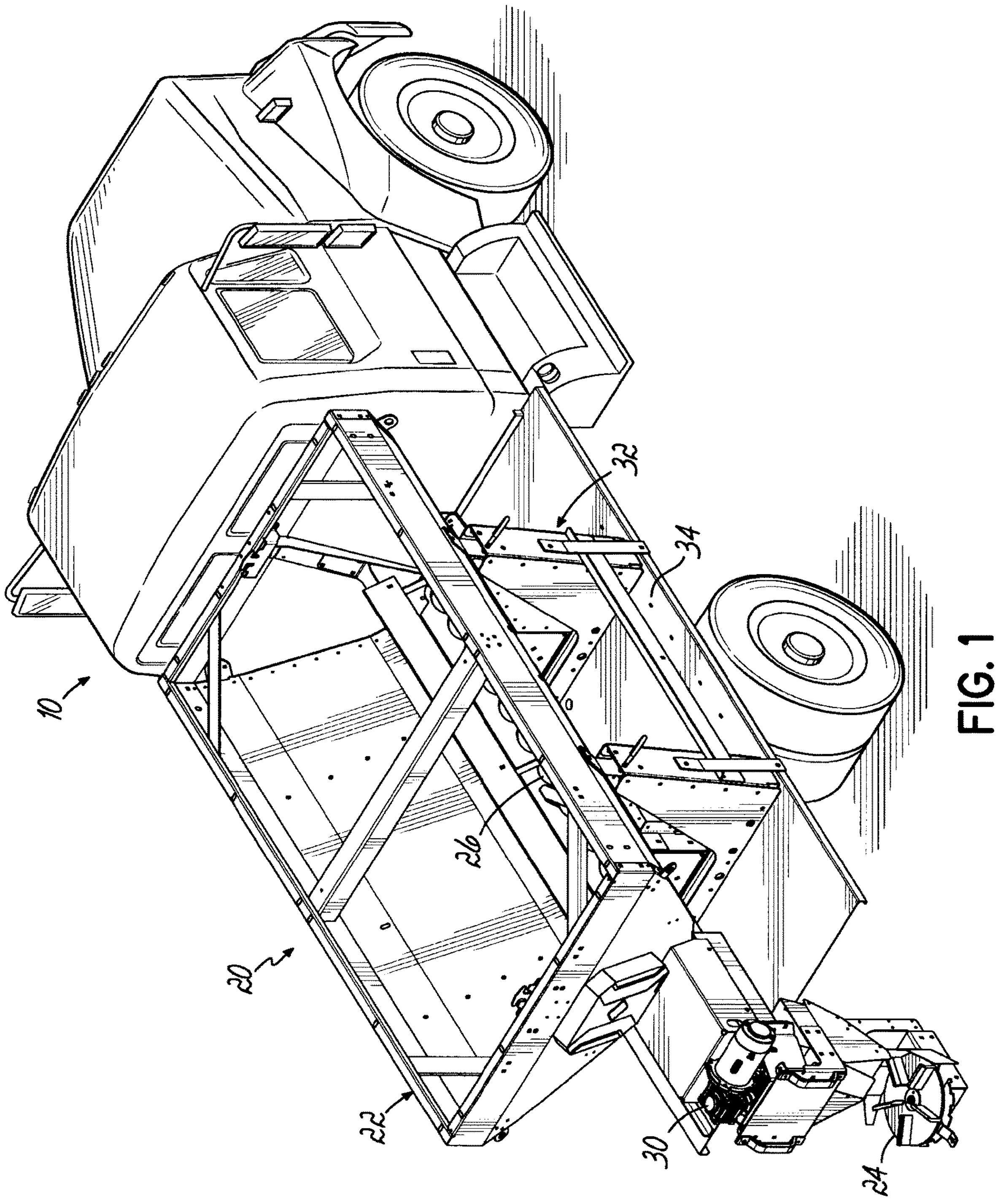
FIG. 1 is a top right rear perspective view of a vehicle and one embodiment of spreader of the present invention.

Referring first to FIG. 1, a vehicle 10 has mounted on it a spreader, sometimes referred to as a hopper spreader, 20 according to the principles of the present invention.

Figure 2:
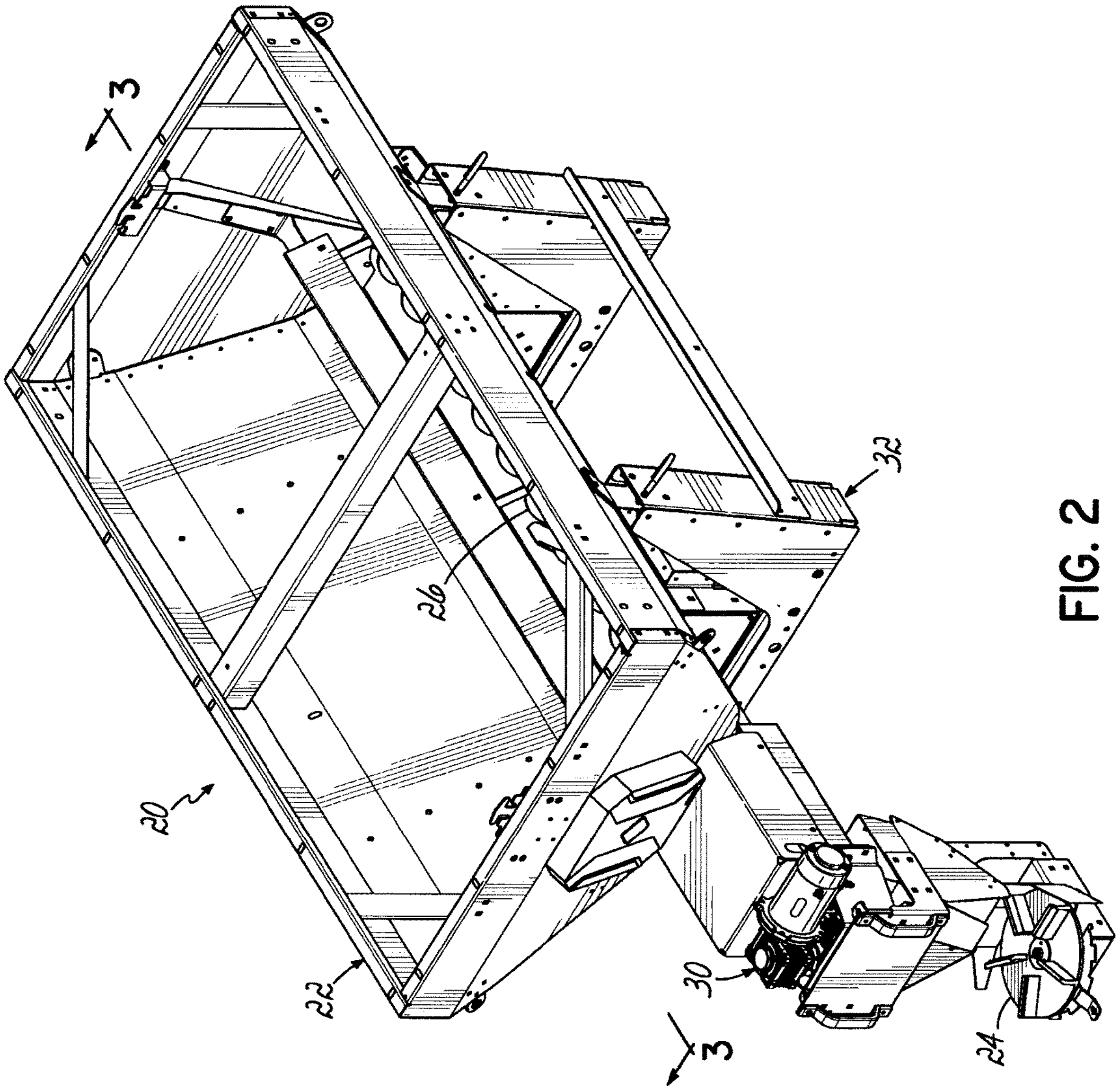
FIG. 2 is an enlarged top right rear perspective view of the spreader of FIG. 1.
Figure 3:
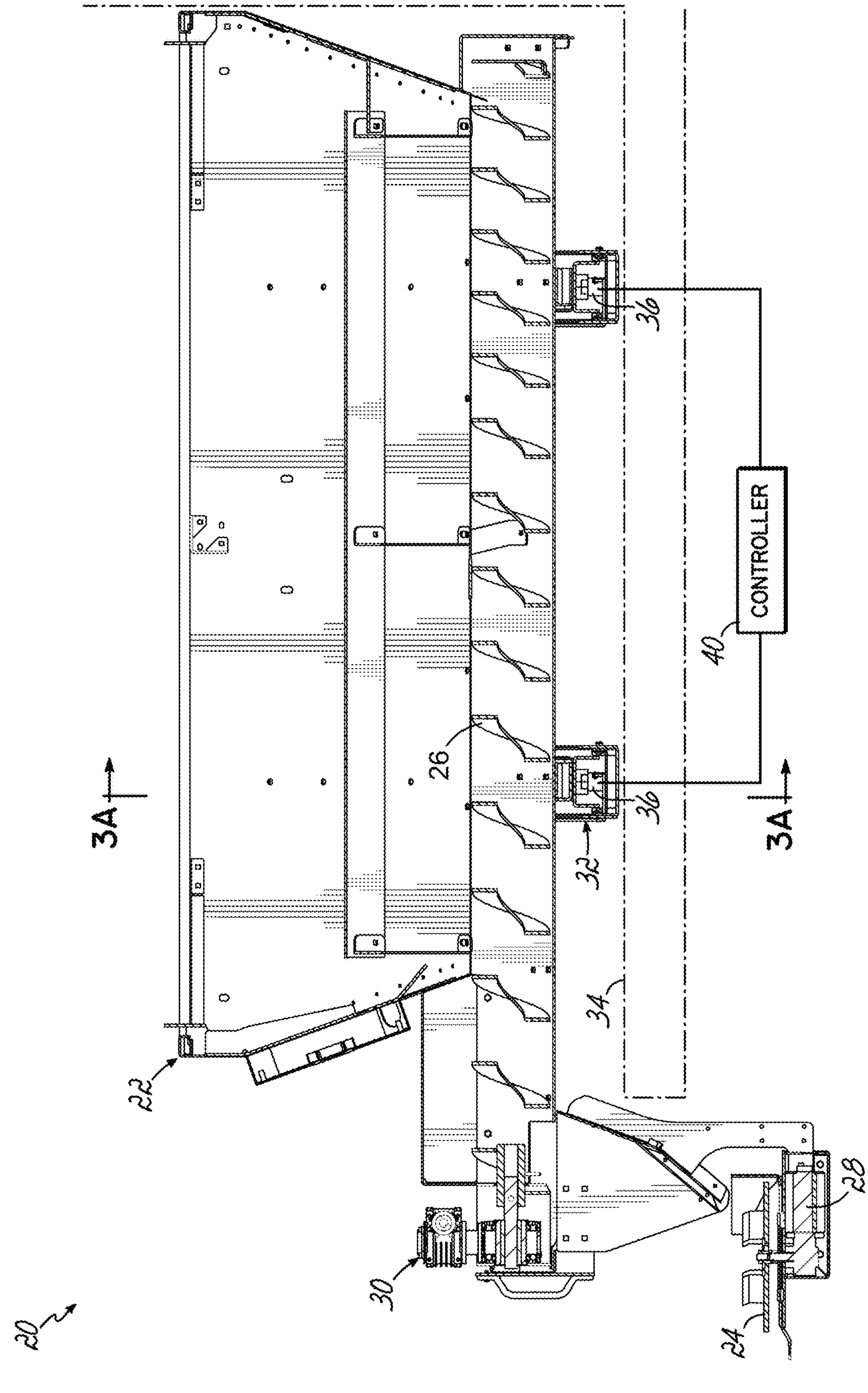
FIG. 3 is a cross-sectional view of the spreader taken along line 3-3 in FIG. 2.
Figure 3A:
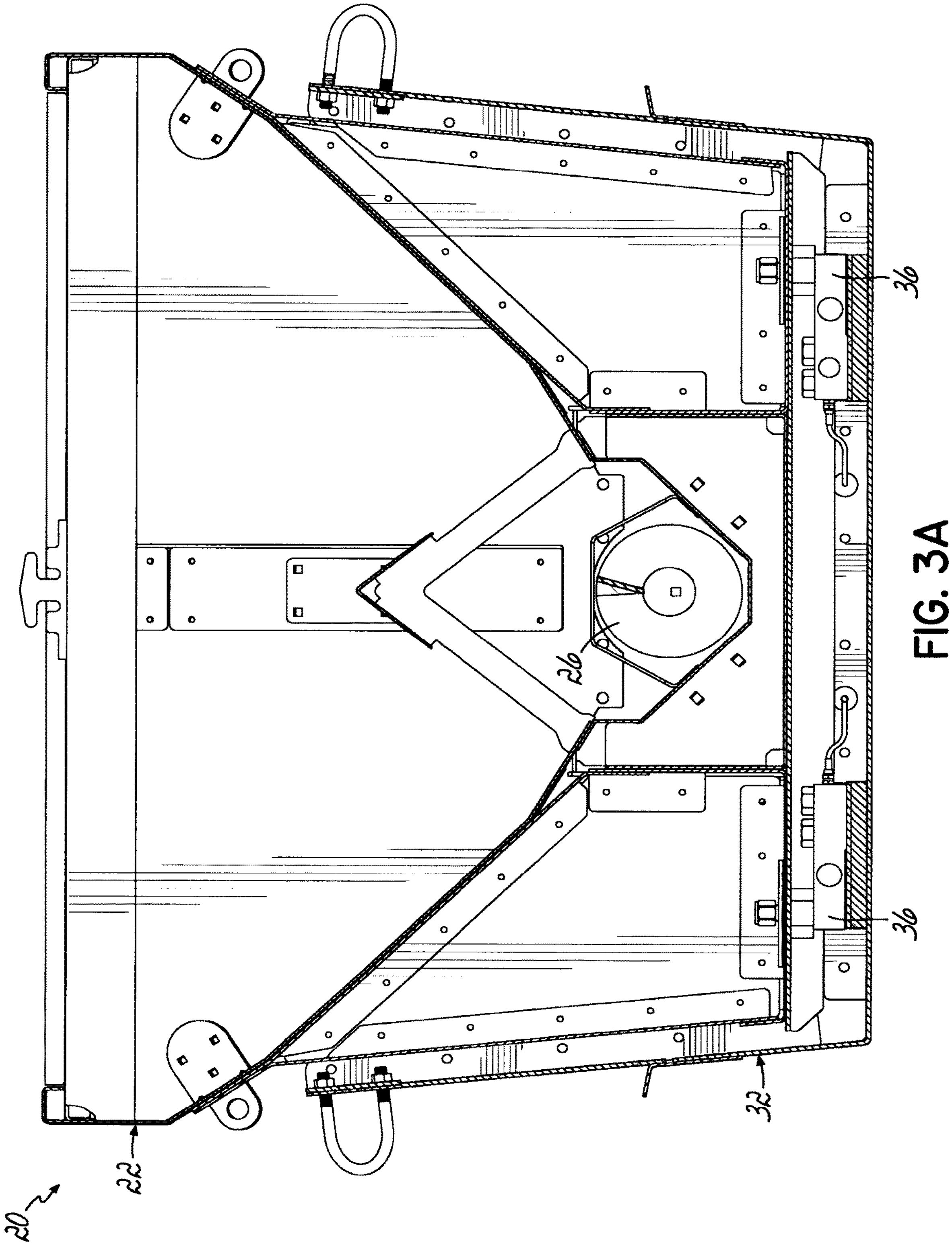
FIG. 3A is a cross-sectional view of the spreader taken along line 3A-3A in FIG. 3.
Figure 4:
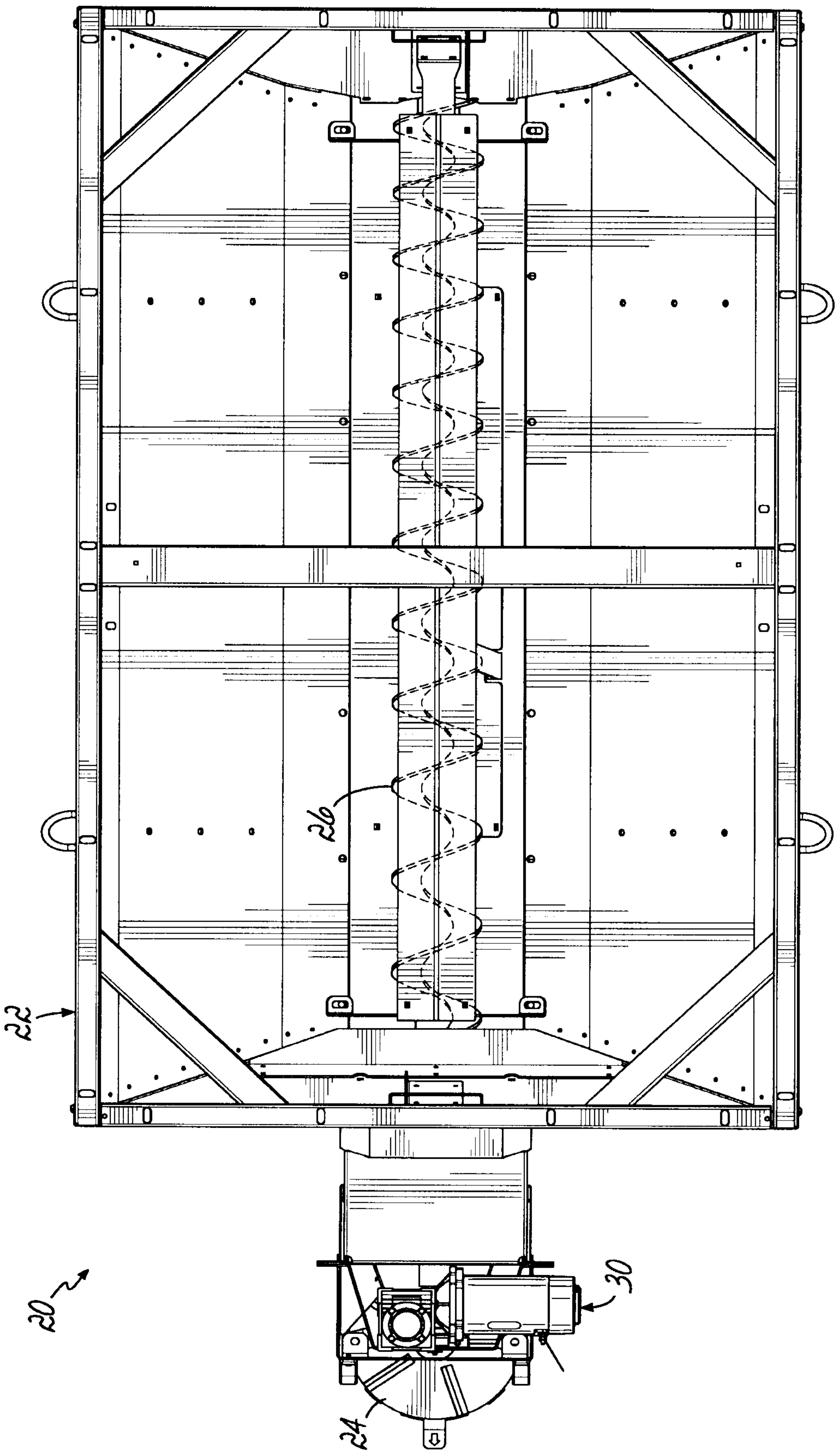
FIG. 4 is a top view of the spreader of FIG. 1.

Referring FIGS. 2-4, the spreader 20 has a material container in the form of a hopper, sometimes referred to as a V-hopper, 22 for containing the material to be spread, a spinner 24 for spreading material, and an auger 26 for conveying the material from the hopper 22 to the spinner 24. Spinner 24 is powered by a motor and gear box 28 (FIG. 3). Auger 26 is powered by a motor and gear box 30. For the purposes of clear illustration of the relevant functions, safety guards or housings that would typically enclose the spinner and other mechanical parts seen in the figures, are not shown, but would be in place in a typical implementation. Additional details of a suitable auger may be seen with reference to U.S. patent application Ser. No. 16/117,123 entitled SPREADER filed Aug. 30, 2018, and U.S. patent application Ser. No. 16/277,647 entitled SPREADER WITH SHAFTLESS AUGER filed Feb. 15, 2019, both of which are hereby incorporated by reference herein as if fully set forth in their entirety.

Figure 2A:
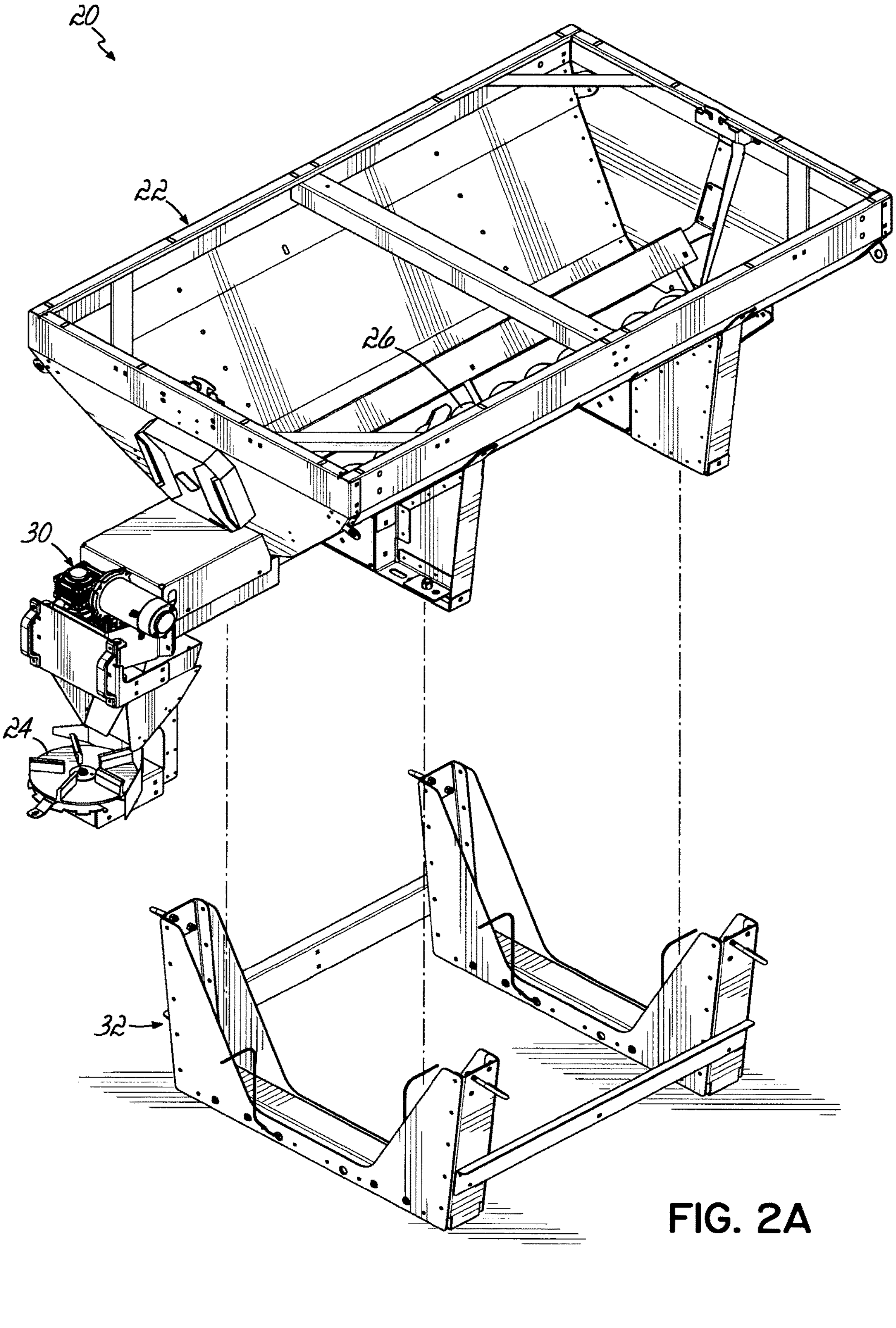
FIG. 2A is an exploded perspective view of FIG. 2.

A cradle 32 is supported upon a bed 34 of vehicle 10. Cradle 32 may be mounted to the bed 34 with by various means (not shown), to allow re-purposing of the vehicle during summer months by removing cradle 32. One mounting method may utilize bolts through the bed or frame, potentially combined with removable straps, or other more permanently mounted devices. Cradle 32 has four load cells 36 supporting hopper 20. Load cells 36 develop signals indicative of the weight of the hopper 20, and hence the quantity of material in hopper 20, which are delivered to a controller 40, typically through an interface module in a controller area network, as discussed below. The cradle and load cells collectively form a scale system that produces material load data. Although in the disclosed embodiment the load data comes from a load cell, other forms of load sensors may be used. In the disclosed particular embodiment, the scale system's structure is assembled with profiled and formed stainless steel parts that are bolted together and/or riveted together, with stainless steel machined blocks used for mounting the load cells beneath each "leg" of the hopper. Load cells used in this embodiment may be obtained from Scale-Tec of 16027 Hwy 64, East Anamosa, IA 52205; however, the system can be made to work with other load cells as well, using alternative components. Various other configurations are feasible, so long as the weight of the hopper is transmitted to the load cells to permit accurate measurement. Furthermore, the configurations of components shown in FIG. 2A et seq. are merely exemplary and could be varied without change to the patented functionality. For example or of both of the legs of the hopper may be positioned differently, or their orientations reversed from the positions shown.

Figure 5:
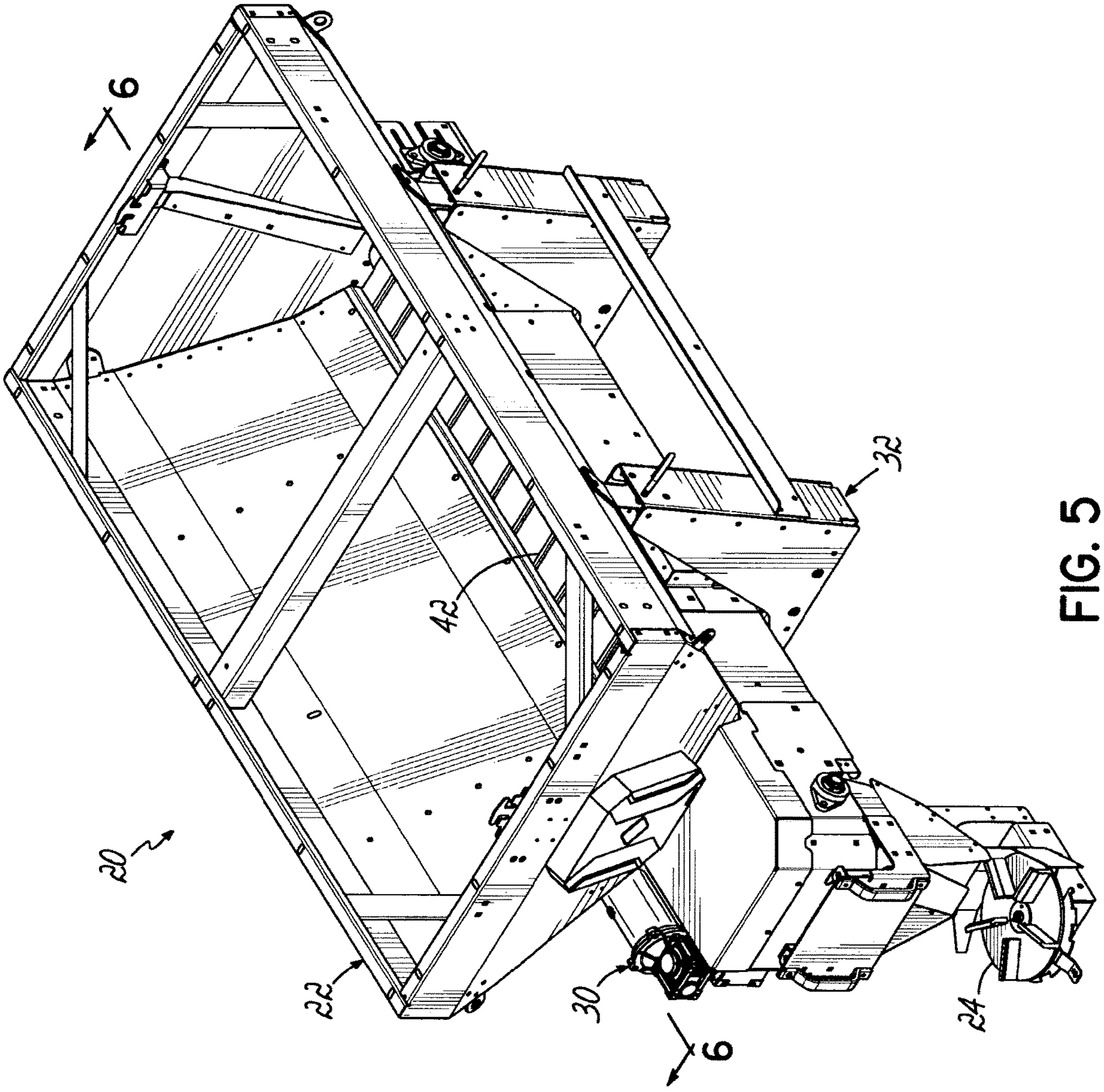
FIG. 5 is an enlarged top right rear perspective view of another embodiment of spreader of the present invention.
Figure 6:
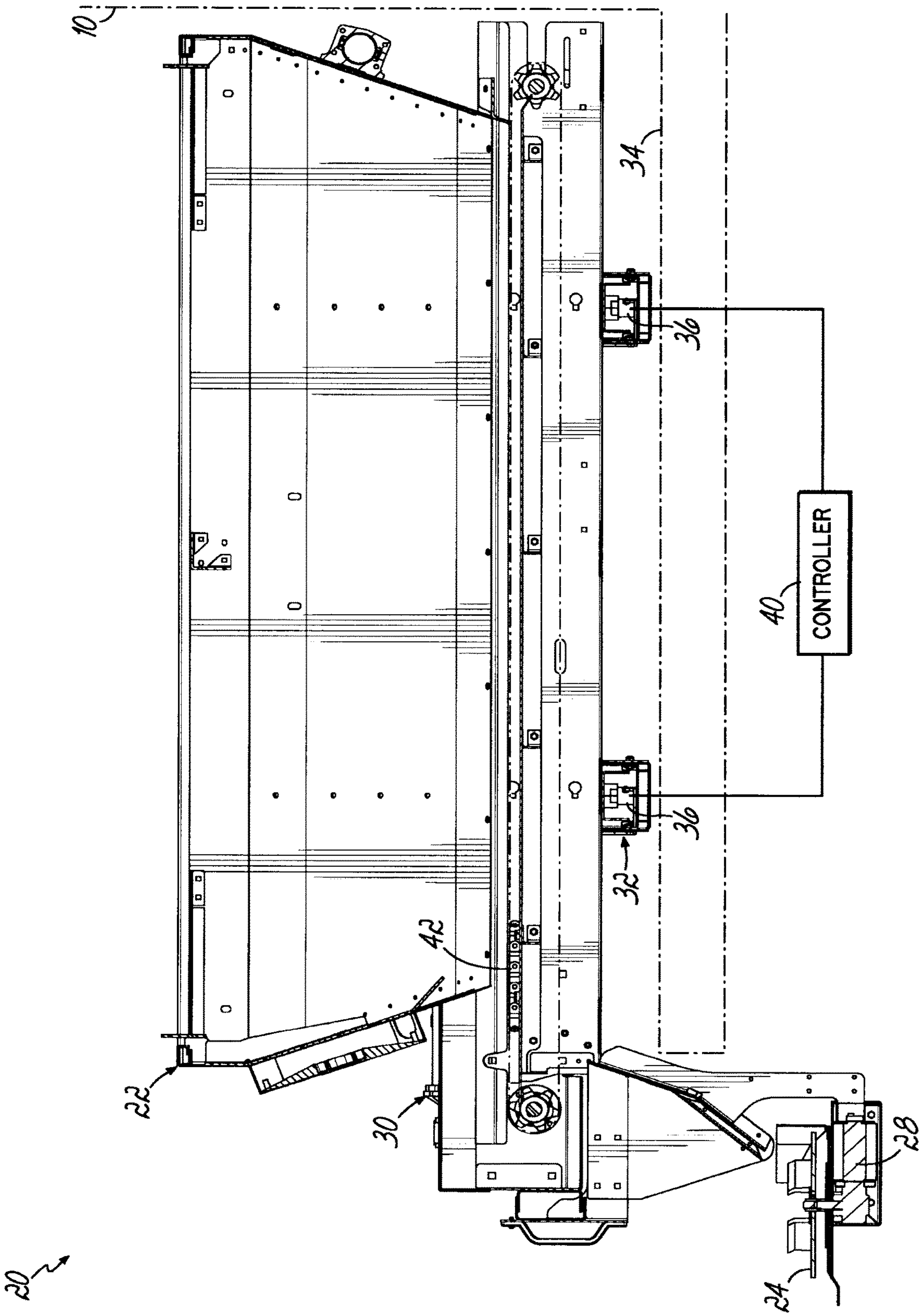
FIG. 6 is a cross-sectional view taken along line 6-6 in FIG. 5.
Figure 7:
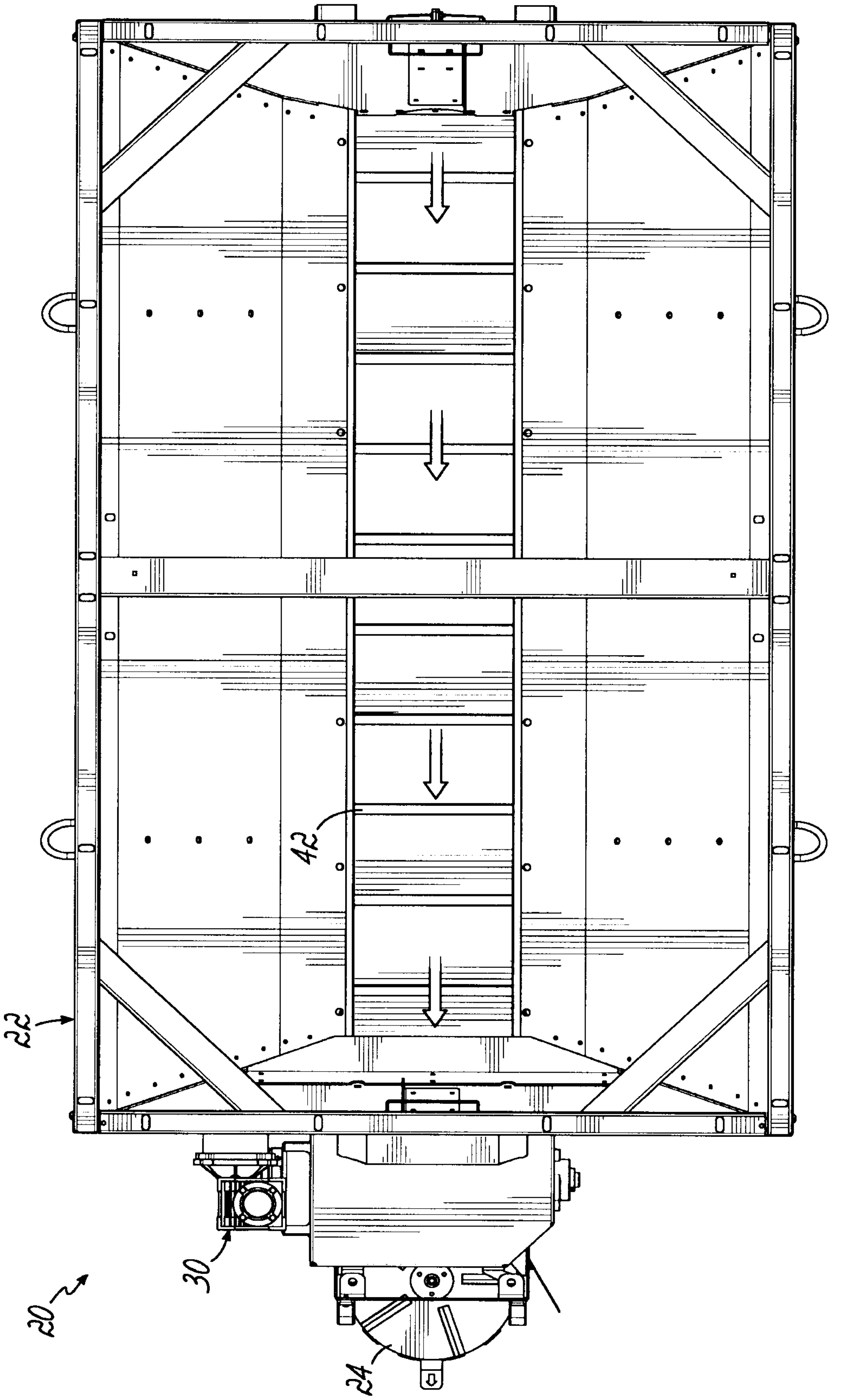
FIG. 7 is a top view of the spreader of FIG. 5.

Referring to FIGS. 5-7, an alternative embodiment of spreader 20 is shown. In this embodiment, a chain conveyor 42 has been substituted for auger 26 of the prior embodiment as the means of conveying the material from hopper 22 to spinner 24. Here again, for the purposes of clear illustration of the relevant functions, safety guards or housings that would typically enclose the spinner and other mechanical parts seen in the figures, are not shown, but would be in place in a typical implementation.

Figure 8:
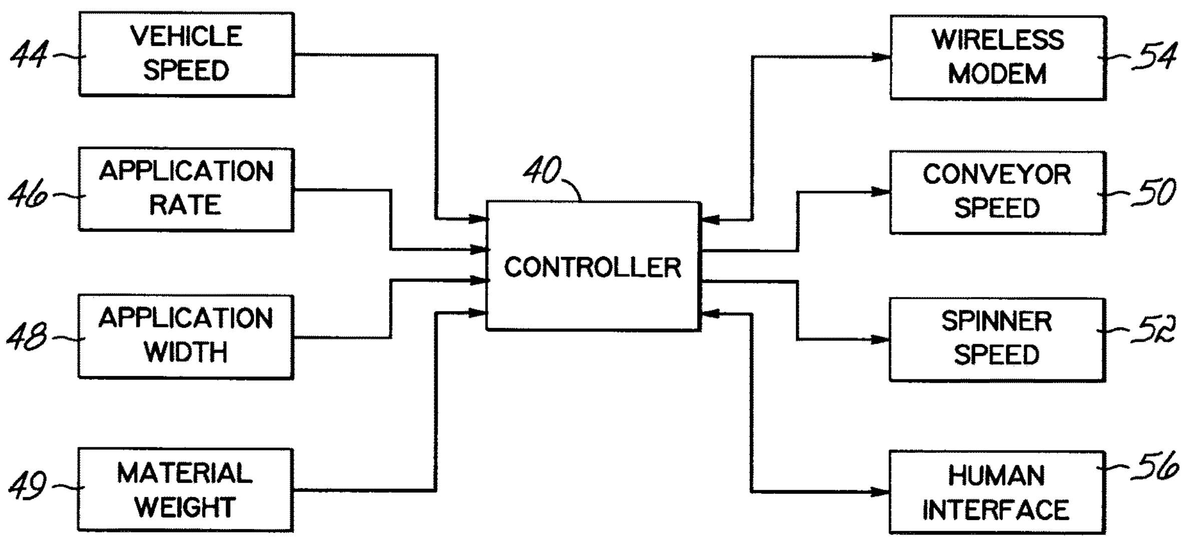
FIG. 8 is an information flow diagram for the controller used in the control system of the present invention.

Referring now to FIG. 8, the information flow of controller 40 in accordance with principles of the present invention can be elaborated. Information is delivered either directly or indirectly (e.g., via a controller area network) from the various and several sources shown in FIG. 8. Controller 40 produces auger/conveyor speed control signal 50 and spinner speed control signal 52 in response to a vehicle speed 44, a programmed application rate setpoint, an application width setpoint 48, and the input of a load sensor 49 indicative of the material weight.

Load sensor may be the load cells 36 discussed above, potentially supplemented for user interface or redundancy/fail-safe purposes with a tank level sensor in the case of delivery of brine material. In the case of delivery of brine material, the auger/conveyor speed control signal 50 can be a pump control for a brine pump. In one embodiment, a flow sensor in the brine supply path may be used to track the flow of brine, or power consumption by the pump may be used as a measure of the flow rate of brine through the pump.

Vehicle speed 44 may be gathered from the vehicle or from a global positioning system (GPS) integrated into or coupled to control 40. Application rate and width setpoints 46 and 48 may be pre-programmed, programmed via the human interface 56, or remotely programmed via wireless modem 54.

The controller may be implemented as one device in a central housing or as multiple distributed devices connected by a communication network. In one embodiment the controller area network (CAN) protocol is used for the networked communication; communication over CAN uses two conductor, twisted pair connections. CAN is electrically resilient in the presence of noise which is why CAN is typically used for vehicle control systems. As one example, load cells 36 may be connected to a load sensor module of the controller area network which receives electrical signals from load cells 36 indicative of material quantity, converts those signals to material quantity data, and relays that data to other devices in the controller network in CAN format. The particular communication method and communication network structure utilized to convey information to the controller may vary without impact upon the principles of the present invention.

Vehicle speed 44 may be acquired by a GPS receiver/antenna using GNSS technology (satellites, sensitivity, etc.) to produce vehicle speed, and optionally location, data at an acceptable reporting rate such as 10 Hz or more, which is sufficient to enable precision control of the spreader rate. GPS further provides high accuracy date and time information.

Controller 40 may include Bluetooth low energy (BLE) circuits and a corresponding antenna to enable wireless communications to other on-board vehicle systems using BLE protocol wireless communications. BLE connections may be used to connect and supply information to a service provider mobile application over a Bluetooth connection to a smartphone or tablet, thus implementing the user interface with user-supplied hardware. BLE communications may also be used for device configuration, calibration, updates, and any other setup operations that are required by the controller or connected devices. BLE may also allow a technician with a suitably programmed BLE compatible device to read status and error codes for onsite troubleshooting of the system, and enable communication with a Bluetooth enabled user device to perform remote diagnostics and live troubleshooting via technical support staff. BLE may also be used to form a personal area network (PAN) cable of collecting data from trackable ancillary assets such as snow shovels and brooms equipped with bluetooth-enabled trackers such as those sold by Tile, a divisional of Life360, Inc. of San Mateo, California. 2.4 GHz BLE radios enable a cost effective and reliable network for connecting this class of device.

Controller is configured with a processor and non-volatile memory used for storage of configuration settings that persist across power cycles and/or lost connectivity.

Controller 40 may further optionally include an on-board diagnostics (OBD-II) interface to connect to the vehicle Engine Control Unit (ECU) via its OBD-II port. The information obtained from this connection can include performance data (fuel consumption, Diagnostic Trouble Codes (DTCs) and ground speed, as well as providing useful setup and configuration information.

Wireless modem 54 is preferably an LTE or 5G cellular modem, enabling connection to the internet. Specifically, the modem may be an LTE-M modem specifically designed for IoT connectivity using low cost data plans enabled by a removable Subscriber Identity Module (SIM) card or using Embedded-SIM (eSIM) technology.

Controller may advantageously include sufficient non-volatile storage to retain a data log, particularly a queue of data from the system which may be retained in the event of data loss or to permit resilience in the event the wireless modem/LTE/5G Internet communication is sporadic or temporarily unavailable. A memory size sufficient for a month of "typical" system usage data retained in the data log would be advantageous by providing a proof of service record. Additional memory space is allocated for buffering over the air updates as they are downloaded from a remote server.

Controller 40, and/or the controller area network modules which collectively form the controller, may be implemented in an IP67 rated water Ingress Protected (IP) housing, with connector ports that for plug-in of wired accessories, in a plastic molded outer cover providing apertures for control cable routing and permitting visibility of one or more status indicator lights.

Figure 9:
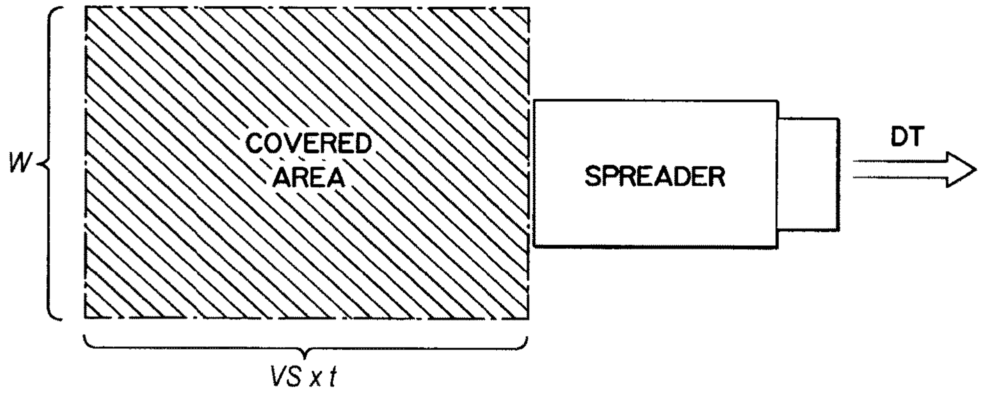
FIG. 9 is a diagrammatic top view of the spreader and material application area.

FIG. 9 provides useful definitional information for explanation of the control strategy used by controller in accordance with principles of the present invention. As seen in FIG. 9, the covered surface area is a function of the width W of coverage created by the current spinner speed, and the vehicle speed VS (km/h) multiplied by the time t over which material was spread. The coverage area is calculated as (factor of 1000 for units conversion of km/h to m/h):

$$\text{Coverage Area}=\text{Application Width}\times\text{Vehicle\_Speed}\times 1000\times\text{Time}$$

The total amount of material dispensed is calculated as:

$$\text{Total Material}=\text{Discharge\_Rate}\times\text{Time}$$

The Application_Rate is calculated as:

$$\text{Application\_Rate}=\text{Total Material}/\text{Coverage Area}$$

Based on the above, one can solve for the Discharge_Rate:

$$\text{Application\_Rate}=(\text{Discharge\_Rate}\times\text{Time})/(\text{Application\_Width}\times\text{Vehicle\_Speed}\times 1000\times\text{Time})$$

$$\text{Discharge\_Rate}=\text{Application\_Rate}\times\text{Application\_Width}\times\text{Vehicle\_Speed}\times 1000$$

The control of the discharge rate is provided by a control system including the controller 40, operating a control strategy. In an embodiment using an auger conveyor, the following are the inputs and outputs:

| Term | Type | Units (SI) | Description |
|---|---|---|---|
| Application_Rate | Input | kg/m$^2$ | Rate at which solids are discharged from the hopper |
| Vehicle_Speed | Input | km/h | Forward ground speed of the vehicle |
| Application_Width | Input | m | Desired ground spreading width of solids |
| Material_Weight | Input | kg | Weight of solids material in the hopper |
| Spreader_Height (TBD) | Input | in | Distance from the ground to the top of the spinner plate |

Spreader_Height, included in the list above, for potential use cases where there is an adjustment to the spreader height (not shown in the present embodiment); spreader height adjustment affects Application_Width and thus could be captured and accommodated if the height is adjustable.

| Term | Type | Units (SI) | Description |
|---|---|---|---|
| Spinner_Speed | Output | % | Drive percentage (PWM output) to the spinner plate motor |
| Auger_Speed | Output | % | Drive percentage (PWM output) to the hopper auger motor |
| Auger_Speed_Clip | Output | bool | Indicates if the auger speed is being clipped (unable to keep up with demand) |
| Spinner_Speed_Clip | Output | bool | Indicates if the spinner speed is being clipped (unable to keep up with demand) |

The following parameters are derived

| Term | Type | Units (SI) | Description |
|---|---|---|---|
| Discharge_Rate | Derived | kg/h | Rate at which solids are discharged from the hopper |
| Auger_Rate | Derived | %/kg/h | Relationship between the Discharge_Rate and Auger_Speed |

The following parameters are used for configuration:

| Term | Units (s) | Description |
|---|---|---|
| Min_Vehicle_Speed | km/h | Minimum speed before smart control is permitted |
| Max_ Vehicle_Speed | km/h | Maximum speed at which smart control is permitted |
| Min_Auger_Speed | % | Auger drive output limited to this minimum value |
| Max Auger_Speed | % | Auger drive output limited to this maximum value |
| Min_Spinner_Speed | % | Spinner drive output limited to this minimum value |
| Max_Spinner_Speed | % | Spinner drive output limited to this maximum value |
| Spinner_Rate | %/m | Rate at which spinner is adjusted based on width |
| Spinner_Offset | % | Offset of spinner speed adjustment |

At the top level, the controller performs this control strategy based upon three inputs, to produce two outputs. The three inputs are Vehicle_Speed 44, Application_Rate 46, and Application_Width 48. The outputs of the control strategy are Auger_Speed 50 (or flow rate for a brine application embodiment) and Spinner_Speed 52.

Figure 10:
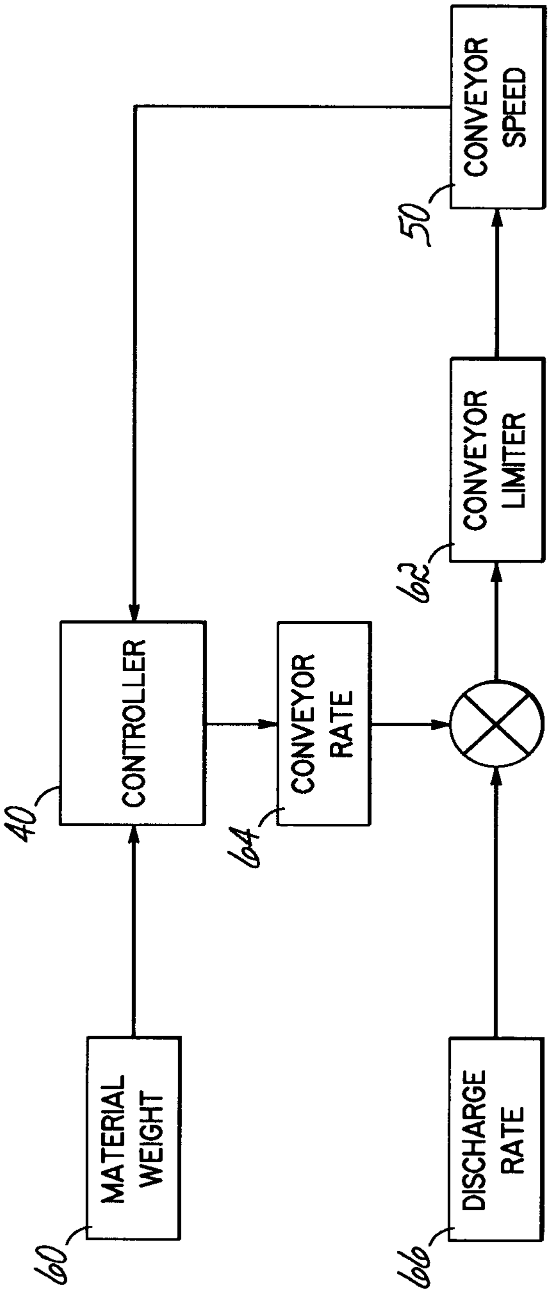
FIG. 10 is a block diagram of the control system implemented with the controller of the present invention.

As seen in FIG. 10, using these inputs, the controller implements a feed-forward control with a system model that is continually monitoring performance via system feedback (material weight 60 identified by a load sensor) and periodically updating the feed-forward control variable, which is the Auger Rate 64.

The determination of the Auger_Speed (50) is computed as:

Auger_Speed'=Auger_Rate×Discharge_Rate

Where Discharge_Rate 66 is computed from Application_Rate×Application_Width×Vehicle_Speed×1000 as derived above.

The Auger Limiter 62 is used to provide an Auger_Speed value that is conditioned from Auger_Speed' as follows:

If Auger_Speed'<Min_Auger_Speed, then Auger_Speed=Min_Auger_Speed    1.

else if Auger_Speed'>Max_Auger_Speed, then Auger_Speed=Max_Auger_Speed    2.

else Auger_Speed=Auger_Speed'    3.

In addition to the foregoing, the controller 40 computes control limits for the purpose of providing feedback to the operator regarding effective operating ranges, as follows:

Max_Auger_Speed=Max_Control_Discharge_Rate×Auger_Rate so

Max_Control_Discharge_Rate=Max_Auger_Speed/Auger_Rate and

Max_Control_Discharge_Rate=Application_Rate×Application_Width×Max_Control_Vehicle_Speed*1000

Solving for max speed:

Max_Control_Vehicle_Speed=1000×(Application_Rate×Application_Width)/Max_Control_Discharge_Rate The Auger_Rate is computed by correlating the predicted spreader performance with the measured data from the scale. Due to the significant noise inherent in a vehicle mounted scale system, a novel approach is implemented. A least-squares regression is repeatedly performed to determine the correlation slope as the auger rate is adjusted on the predicted performance data until the slope is near a value of one, which aligns with an auger rate value that very closely matches the recorded data for that time period.

Spinner_Speed=Application_Width*Spinner_Rate+Spinner_Offset

Brine—Liquid Applications

In brine applications, in one embodiment, an in-line flow meter may be used to measure flow of brine, however, the flow rate of liquid may alternately be controlled using a novel approach involving sensing of power consumption of the pump relative to the PWM output of the controller. This method is described in this section.

The liquid application flow rate is set by the main control system based on several parameters. In a typical direct liquid application, the flow rate is determined by a desired application density and vehicle speed. In alternative or enhanced embodiments, the system may also support a pre-wet application, using a pre-wet accessory or attachment (see FIGS. 16-17, below). To support such an accessory the main control system would determine a desired salt application density, and desired water to salt ratio, and establish the flow rate and target vehicle speed from these additional variables.

Because this sub-system uses a diaphragm pump to move the liquid, the pressure in the plumbing and the current consumption of the pump motor are strongly correlated. Further, fluid flow is the result of pressure differential within a fluid system, and therefore, the fluid flow rate is also correlated with the pump's current consumption.

Because the controller is aware of the pump's duty cycle, the control algorithm can effectively follow a pressure vs current curve generated by a characterization process for discrete duty cycle settings.

Figure 11:
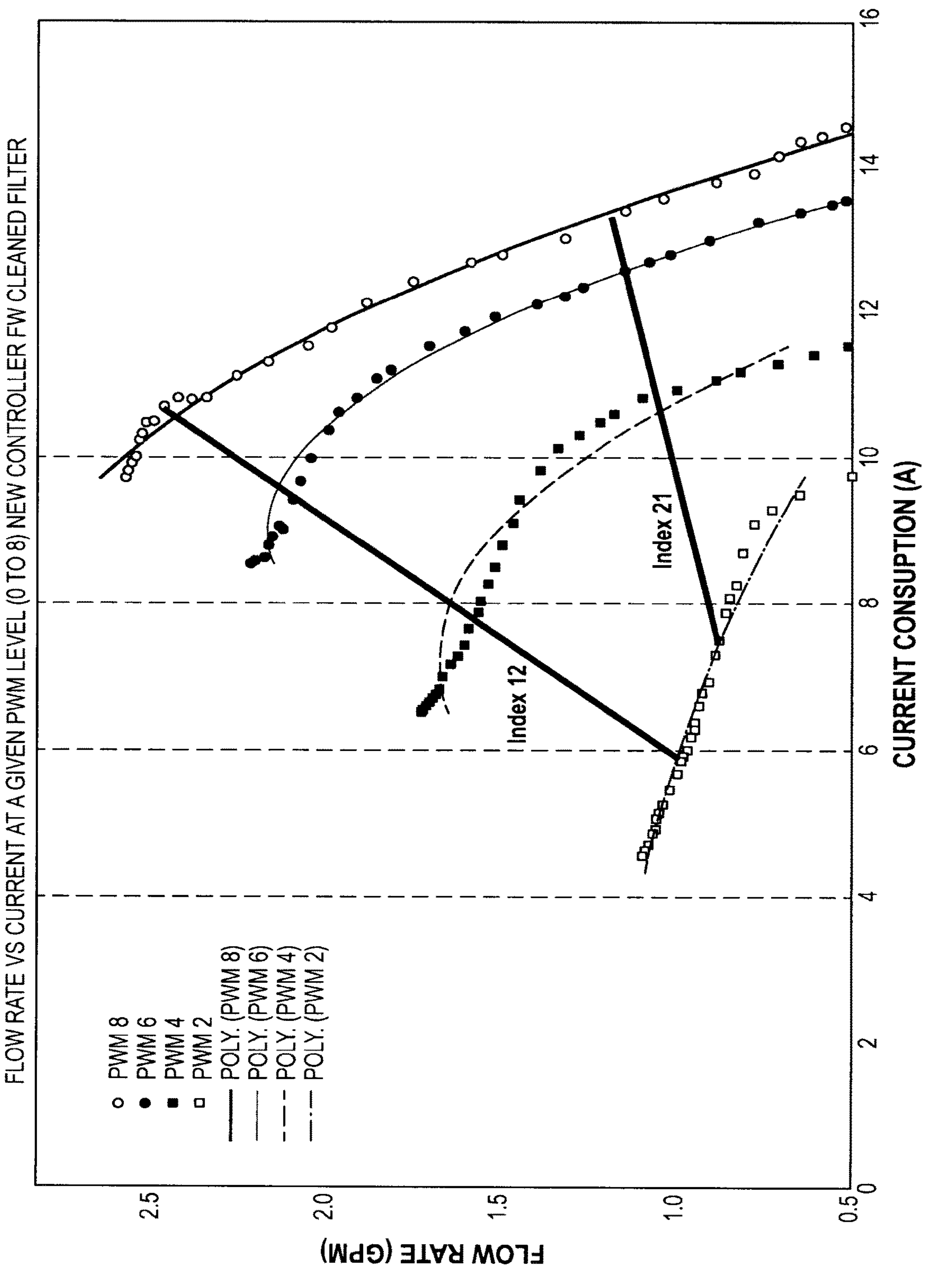
FIG. 11 is a graph depicting empirical characterization curves and data points from which those curves were derived, for the relationship between motor current and flow rate for a given motor at several PWM duty cycle settings.

The plot of FIG. 11 shows the data that was collected and the resultant mathematical model curves for a given motor and PWM (duty cycle).

Implementing this model, in one exemplary embodiment, the firmware in the controller has functions that solve for the flow rate based on the empirical characterization curves of FIG. 11. The firmware can also interpolate between the discrete curves for duty cycles (PWM Values) between those shown below.

The controller sets a liquid flow rate setpoint and an initial PWM duty cycle to start the flow of liquid.

Under normal conditions at the startup of the pump, the duty cycle can be set to a nominal value based on the characterization curve and should provide a flow rate very close to the set point. The controller then measures the pump's current consumption.

Using the current consumption and the known duty cycle, the controller can then determine the flow rate of liquid from the model curves shown in FIG. 11.

The controller then adjusts the pump duty cycle appropriately until the flow rate calculated from the current consumption satisfies the setpoint.

Notably, the outlet orifice may change due to wear or build-up of deposits, causing a pressure change within the plumbing system that impacts the flow rate for a given duty cycle. If the orifice becomes larger, the pressure drop decreases (current consumption also decreases), and the flow rate increases. If the orifice becomes smaller, the pressure drop increases (current consumption also increases), decreasing the flow rate. The following scenario demonstrates this logic:

Assume the orifice is of nominal size, the pump is operating at a given PWM value (duty cycle) of 4 in the plots of FIG. 11, and the desired flow rate is 1.25 GPM. At this condition the current consumption is 10 A.

Assume that the orifice is made larger due to wear, i.e. the pressure drop and current decreases to 9 A and the flow rate is now ~1.5 GPM, and the duty cycle is unchanged.

In an open-loop system, this condition would go undetected. However, by measuring the pump's current consumption according to the described method, the controller will calibrate for this change of circumstance. Specifically, the controller will adjust the duty cycle downwards in the described scenario. By interpolating the curves between PWM 2 and PWM 4, one can see that the appropriate duty cycle for a setpoint of 1.25 GPM would be ~PWM 3.

In FIG. 11, the curve-fit regression lines inform the algorithm how the flow rate will change as the power consumption is changed for a given orifice size that corresponds to the index value of the data point along each PWM curve.

Consider that upon initial start of the pump, the set point is 1 GPM.

For the sake of illustration, the nominal orifice and pressure drop could be established to correspond to the size of the orifice used to generate the data point at index value 12 along the curve.

Using the illustrated curves, with this nominal orifice, to achieve a 1 GPM flow rate, the duty cycle should be set to PWM 2 which would be expected to cause ~6 amps of current consumption.

In this nominal system, the regression line may be used to determine the flow rate for each given duty cycle/current consumption (PWM 2, PWM 4, PWM 6 or PWM 8, each represented by one of four associated regression lines).

Regression between the lies shown in FIG. 11 is accomplished based upon current consumption. For example, in the example above, where ~6 amps of current consumption would be expected, consider a case where upon measuring the current consumption, it is found to actually be ~7.5 amps.

This indicates that some deposits have built up in the plumbing causing a larger pressure drop and therefore a lower flow rate. Using the PWM 2 regression line, the actual flow rate can be estimated to be of ~0.75 GPM.

This regression process, when performed by the algorithm allows the system to recalibrate on the basis that the effective orifice size corresponds to the orifice size used to generate the data points at index value=21.

From the characteristic data and the live data combined, the system thus will have an understanding of the effective orifice size in the plumbing.

At this point, the algorithm can take advantage of the regression lines to inform the system how to adjust the duty cycle of the pump to achieve the desired set point. For example, to restore a 1 GPM flow rate, the process can be visualized by following the line from Index 21 until it intersects with 1 GPM on the vertical axis. In this data set, this would correspond to setting the duty cycle to ~PWM 3 or in other words, adjusting the duty cycle until the current consumption is ~9 amps.

It should be noted that this algorithm could be used to notify a user of changes in the plumbing up stream of the pump. For example, in the event the pre-pump filter becomes clogged with algae and biological matter, this can dramatically impact performance, particularly where the pump is a diaphragm pump that is significantly limited in its ability to produce a vacuum as compared to its ability to create positive pressure. In some of the extremes of the experiment, this was sufficient to limit flow into the suction side of the pump. In such a scenario, both the flow rate produced and current consumption were significantly reduced. This is because when the pump is unable to draw fluid in during the suction cycle, the diaphragm(s) collapse under the vacuum. This results in the diaphragms being unfilled or under filled when the pump reaches the compression cycle, greatly reducing flow and output pressure which effectively means the pump motor is freewheeling, resulting in the drop in current consumption as well.

Figure 12:
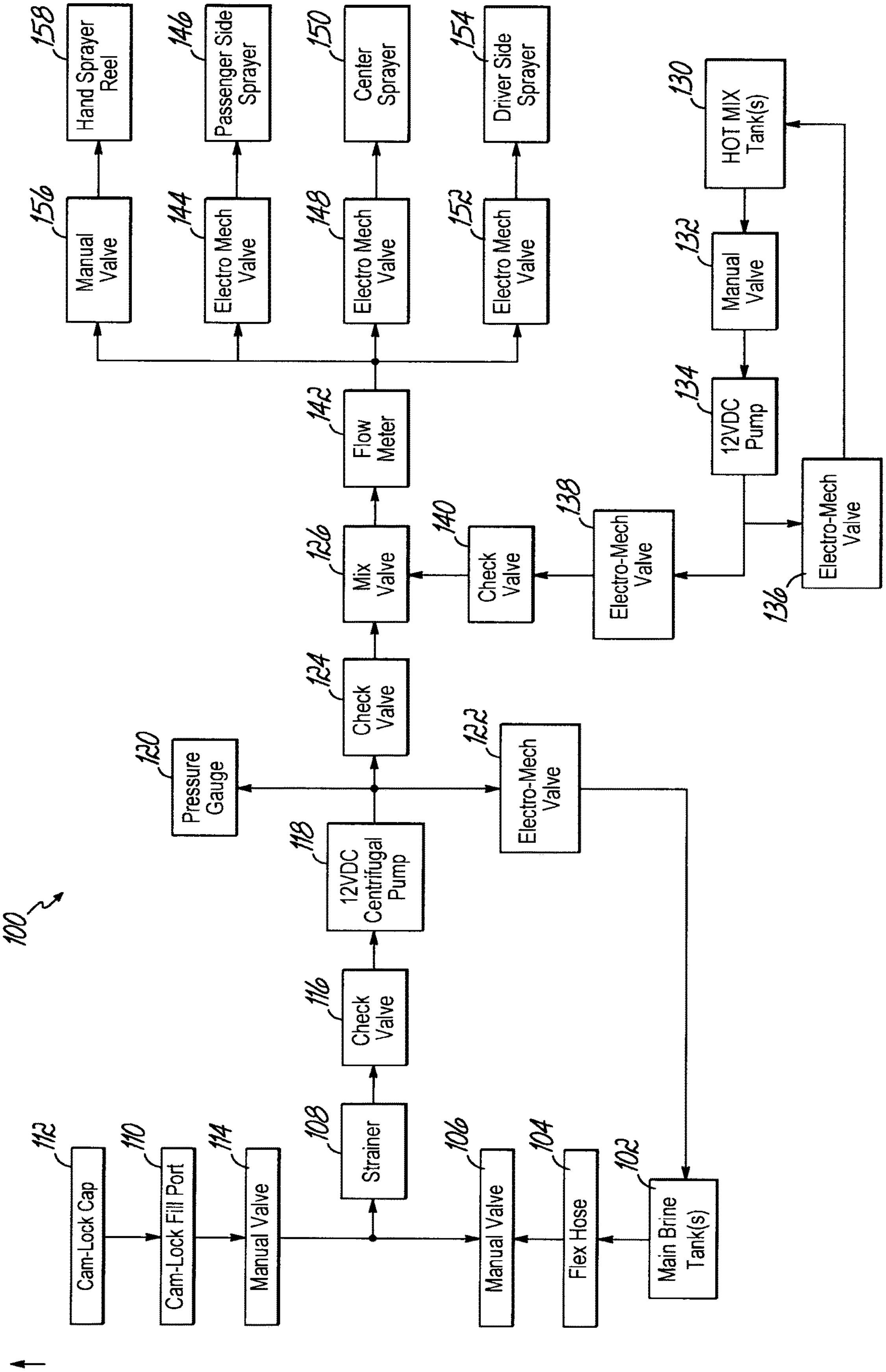
FIG. 12 illustrates a liquid plumbing system for producing a mixture of brine and hot mix to various delivery points in an alternative embodiment of the present invention.

FIG. 12 illustrates a liquids plumbing system 100 for producing a mixture of brine and hot mix to various delivery points in one particular alternative embodiment of the present invention, illustrating a manner in which principles of the present invention may be applied to application of liquids from a tank. In this embodiment, brine is delivered from a main brine tank 102 via flex hose 104 and a manual valve 106 to a strainer 108 where any particulate of concern is removed. (A fill port 110 also connects via this path, accessible by removing a cam lock cap 112 to expose the cam-lock fill port 110, which can be used for filling by opening a manual valve 114.) Brine passed through the strainer 108 is delivered via a check valve 116 to a 12V DC centrifugal pump 118, the output of which is delivered via a check valve 124 to a mixing valve 126. The pressure of the delivered brine is detected by a pressure gauge 120 which controls an electromechanical valve 122 in a recirculate path back to the main brine tank 102; valve 122 is opened and closed to manage brine pressure and mixing.

Hot mix (also known as enhanced salt brine) may also be delivered for mixing with the main brine solution via a second delivery system including a hot mix tank 130, which delivers hot mix through a manual valve 132 and 12 Volt DC pump 134; the flow rate or pressure of hot mix is controlled by a recirculating electromechanical valve 136 coupled to the Hot Mix tank, and a second electromechanical valve 138 which delivers hot mix through a check valve 140 to the mixing valve 126.

In the illustrated embodiment, mixed brine and hot mix emerge from the mixing valve 126 into a flow meter 142 which measures delivery rate of the mixture. The output of the flow meter is delivered to one of several delivery points, including a passenger side sprayer 146, center sprayer 150 and driver side sprayer 154, each of which has an output controlled by a respective electromechanical valve 144, 148 and 152, using the control strategies discussed herein. In addition, a manual valve 156 coupled to the flow meter output delivers brine and hot mix to a hand sprayer on a hose reel 158, allowing manual delivery of product by an operator in special treatment situations.

Figure 13A:
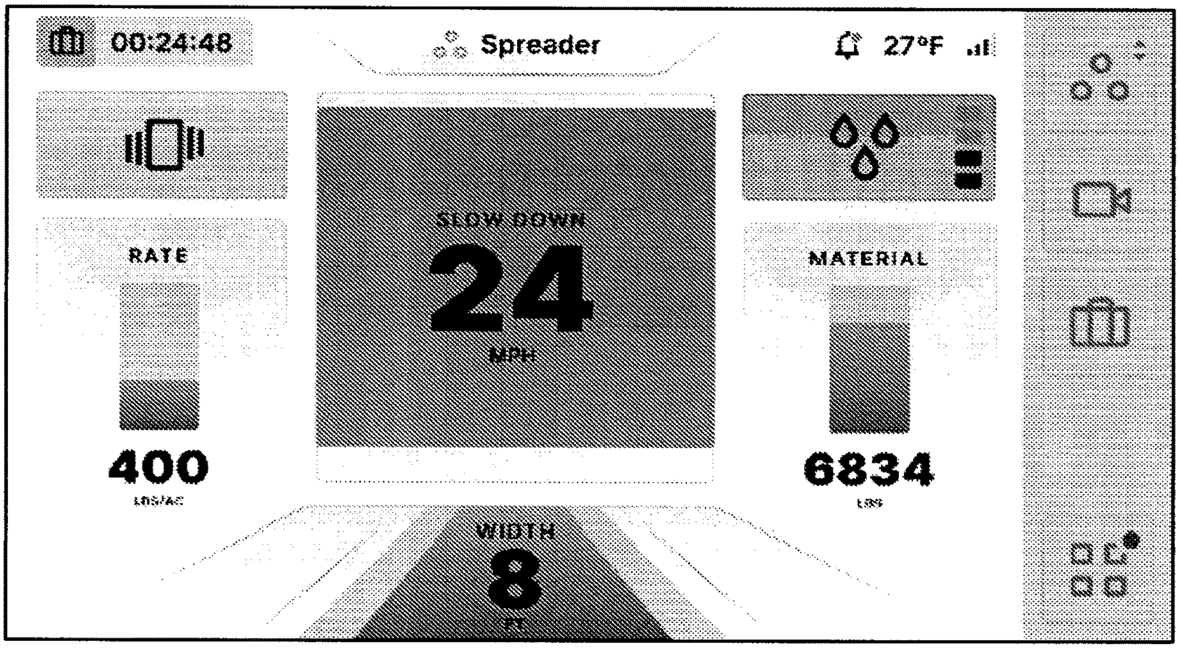
FIGS. 13A, 13B and 13C illustrate display screens produced to an operator to enable proper management of vehicle speed for product delivery.
Figure 13B:
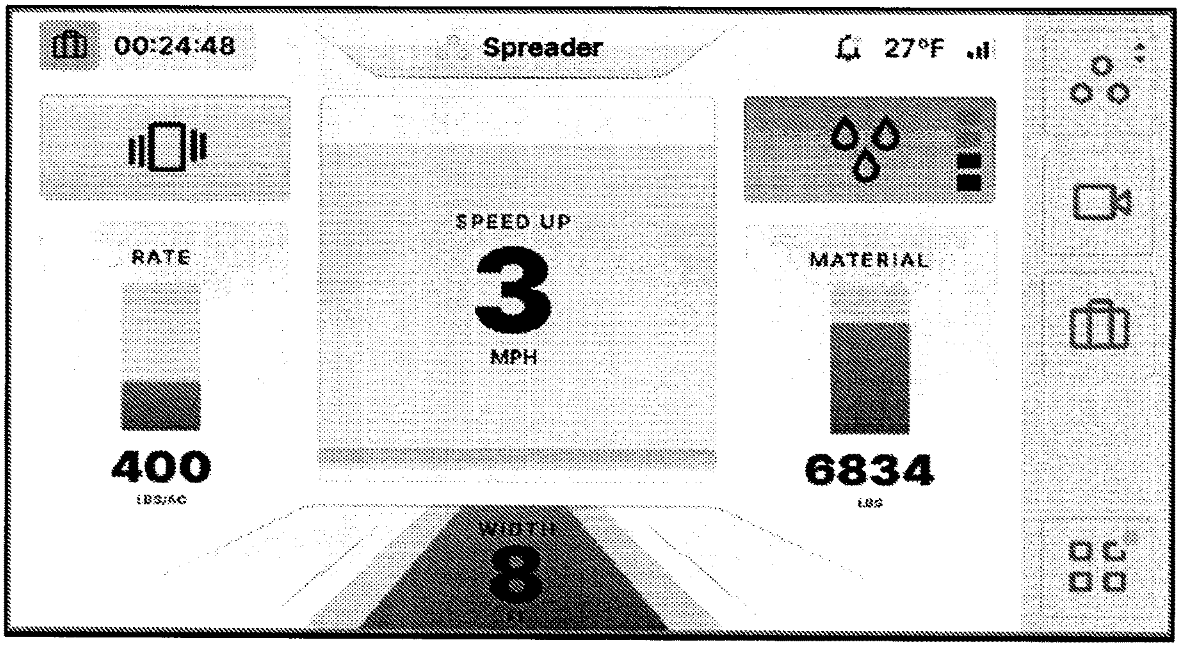
Figure 13C:
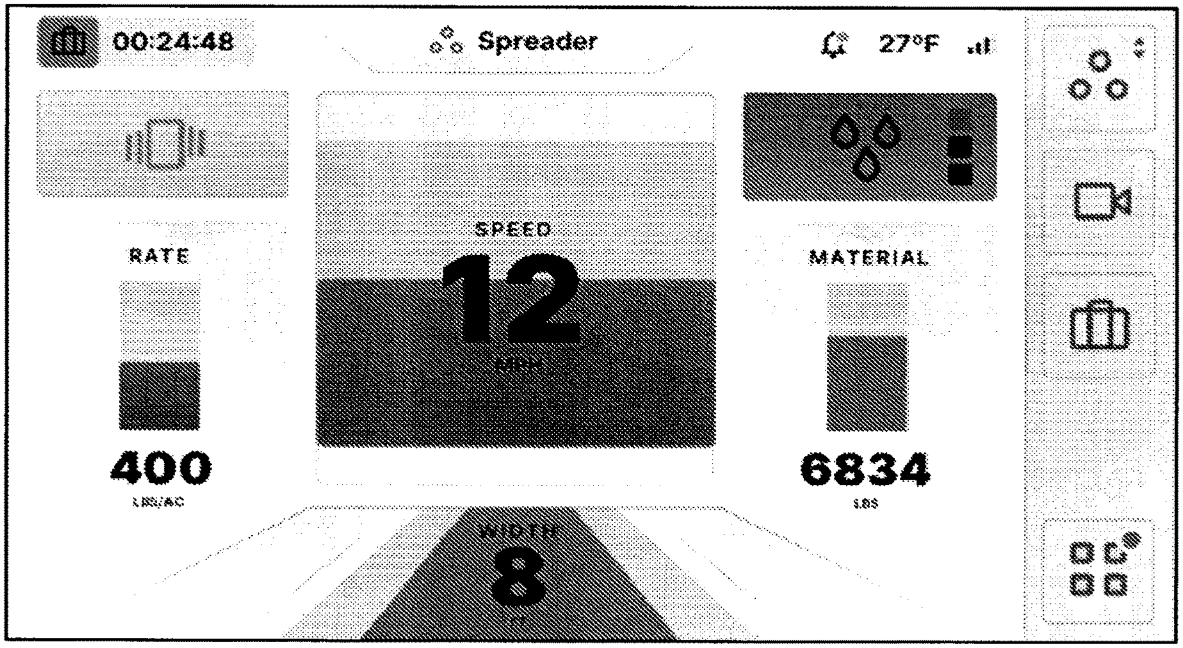

Referring now to FIGS. 13A-13C, one embodiment of the displays generated by the smart controller 40 on human interface 56 provides simplified feedback to the operator by way of visual cues as to whether the current vehicle speed is in a proper range to permit product delivery at the current set point. As seen in FIG. 13A, in the case the vehicle is traveling at too fast a speed to permit adequate product delivery (product cannot be delivered rapidly enough), a prompt is provided to visually indicate excessive speed (e.g., a background color red) and to provide corresponding text such as "Slow Down." As seen in FIG. 13B, when the vehicle is not traveling fast enough to permit product delivery (product cannot be accurately delivered slowly enough for the current speed), a prompt is provided to visually indicate insufficient speed (e.g., a brown background color) and to provide corresponding text such as "Speed Up." FIG. 13C illustrates a display indicating the vehicle is moving at an appropriate speed, visually indicated (e.g., by a green colored bar graph). Each display includes additional information in an intuitive fashion, such as the rate of product delivery ("Rate"), the amount of remaining product ("Material"), the current speed ("Speed MPH"), the width of product delivery, and the amount of remaining liquids (bar graph with droplet icons).

Referring now to FIGS. 14A through 14F, an embodiment of a central tracking interface for use in conjunction with the present invention can be elaborated. The premise of this central interface is to "capture all work done". In this spirit, a web application powered by a server collecting data from the various vehicle controllers (via wireless modem 54) presents various screens to allow service providers to track and report on the work their organization is providing to various customers. Due to the novel "Smart Spreader Control Algorithm" and the hardware capabilities of the supporting hardware described herein, the web application is able to report on material usage and service visit details.

Figure 14A:
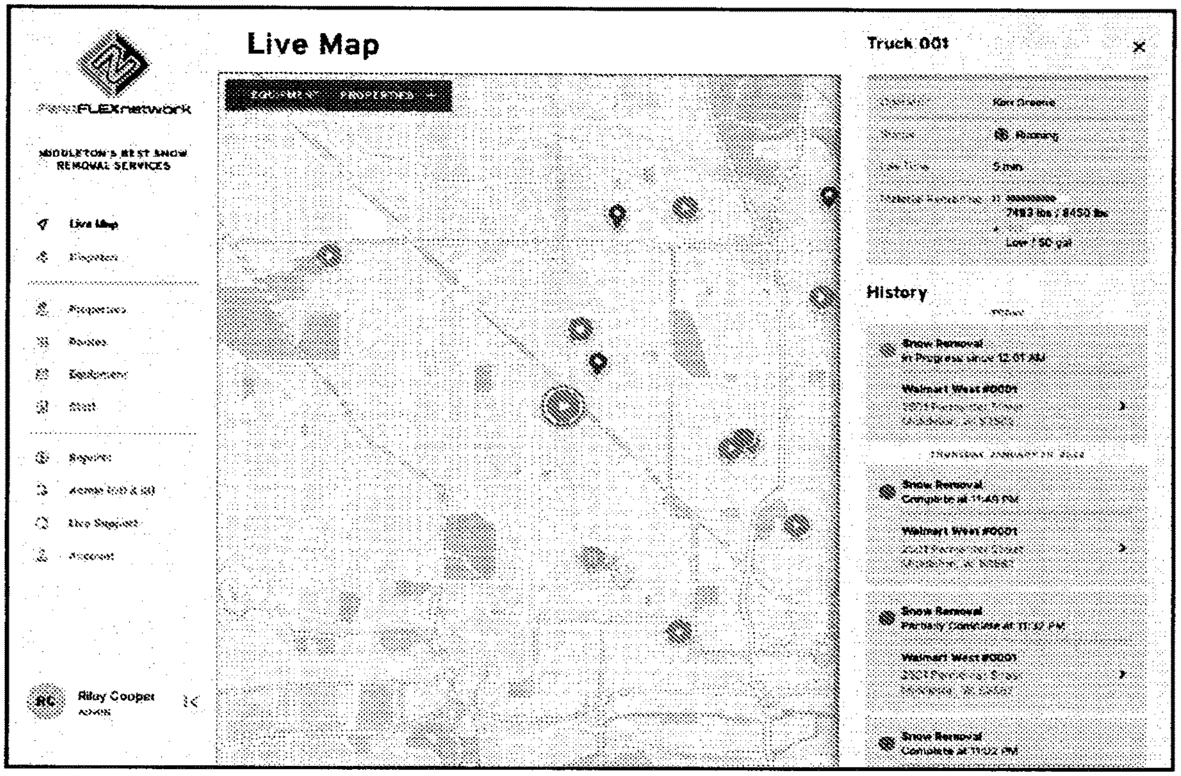
FIGS. 14A, 14B, 14C, 14D, 14E and 14F illustrate display screens presented to a service provider remote home office to enable control and tracking of product delivery.
Figure 14B:
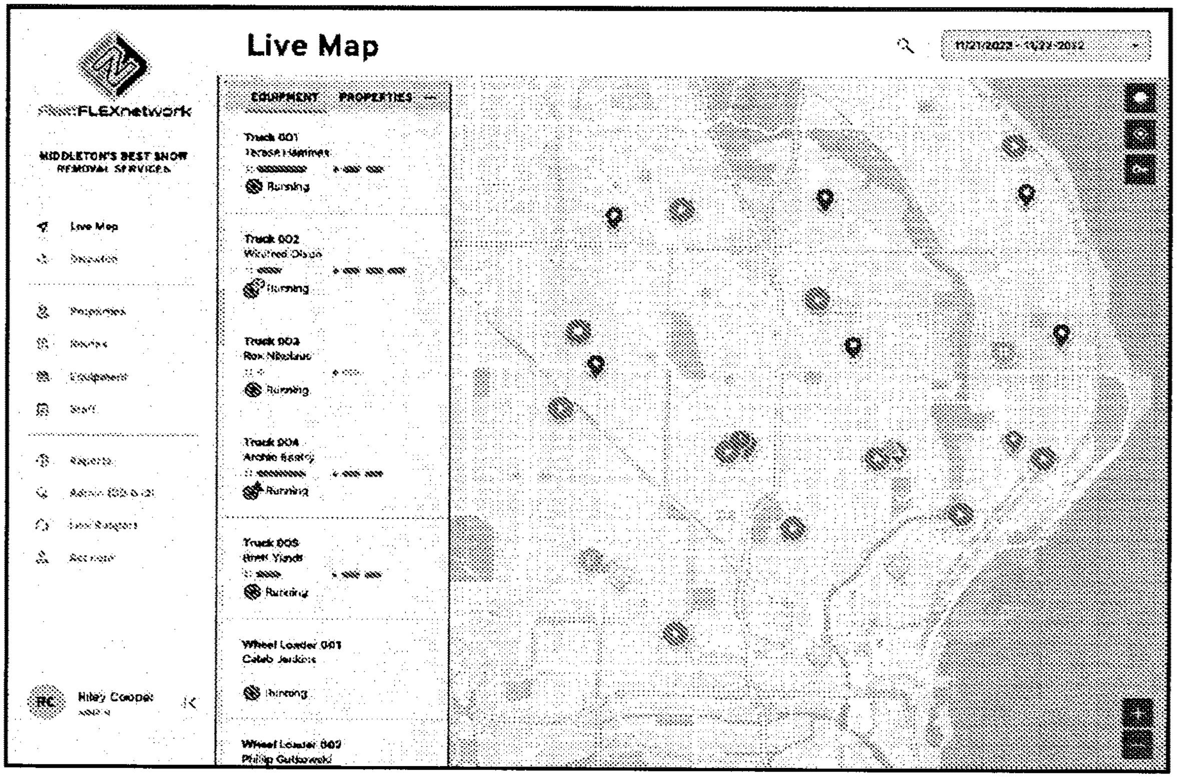
Figure 14C:
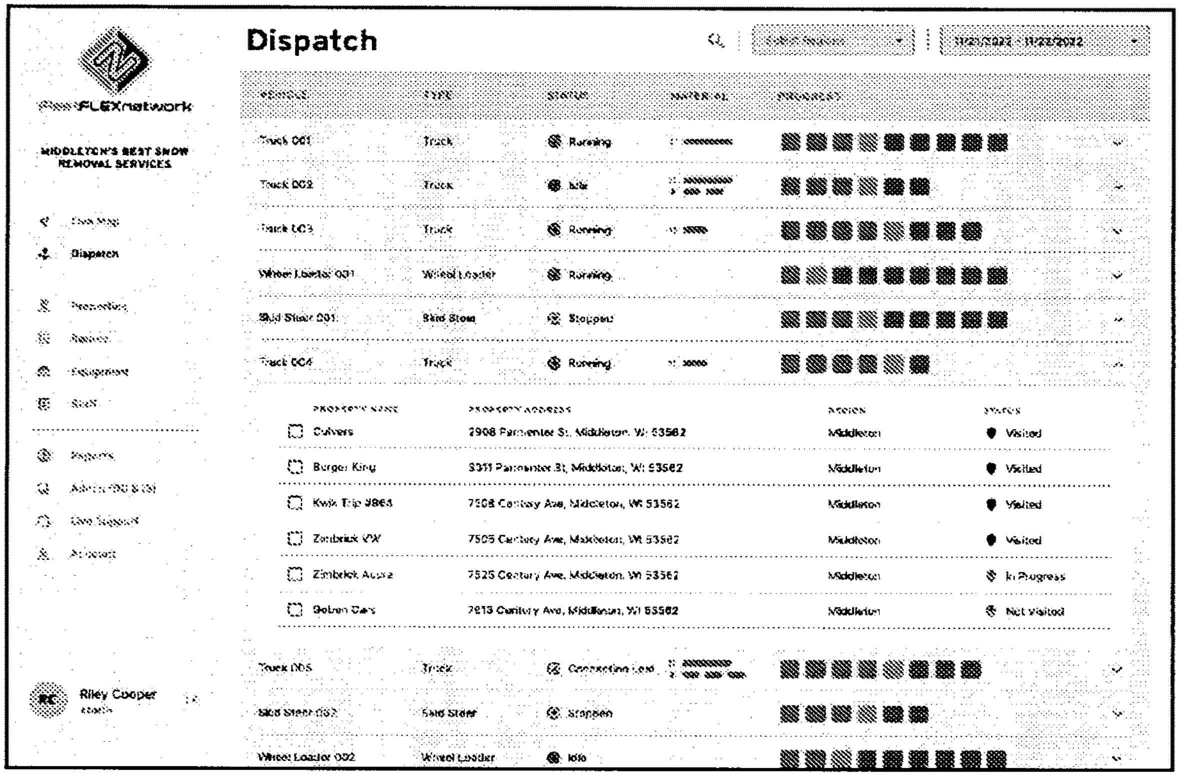
Figure 14D:
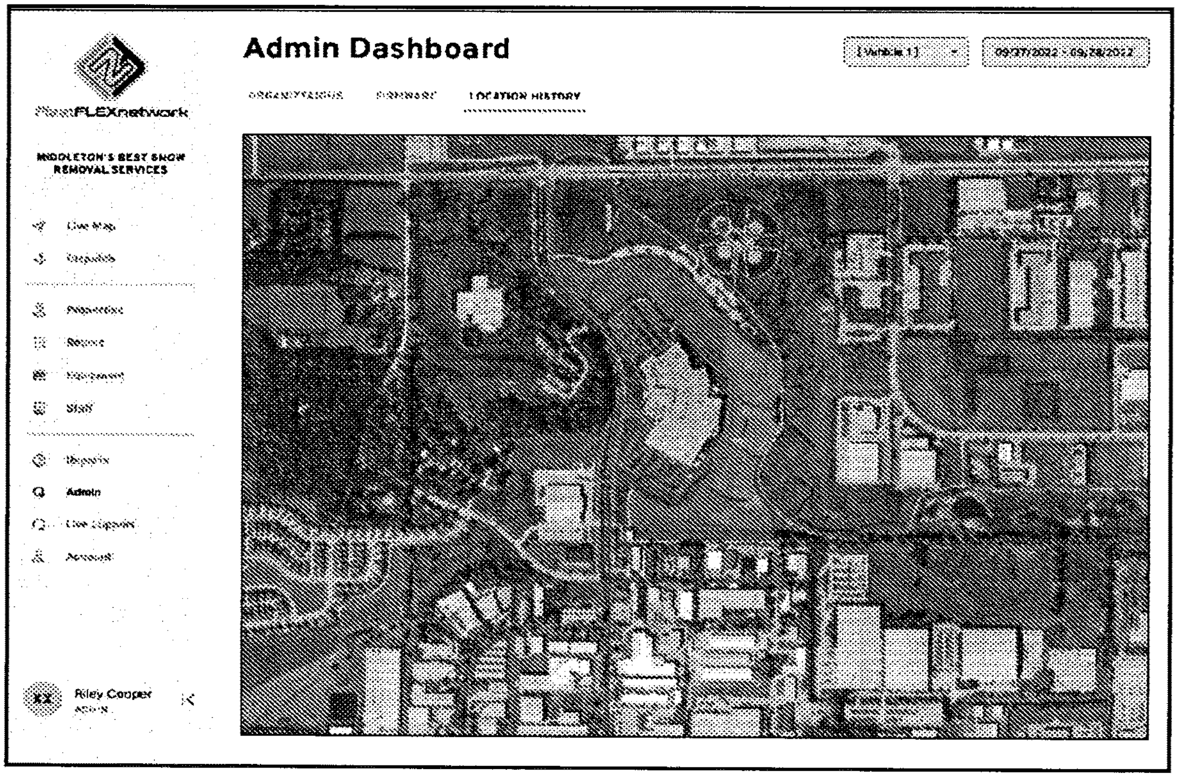
Figure 14E:
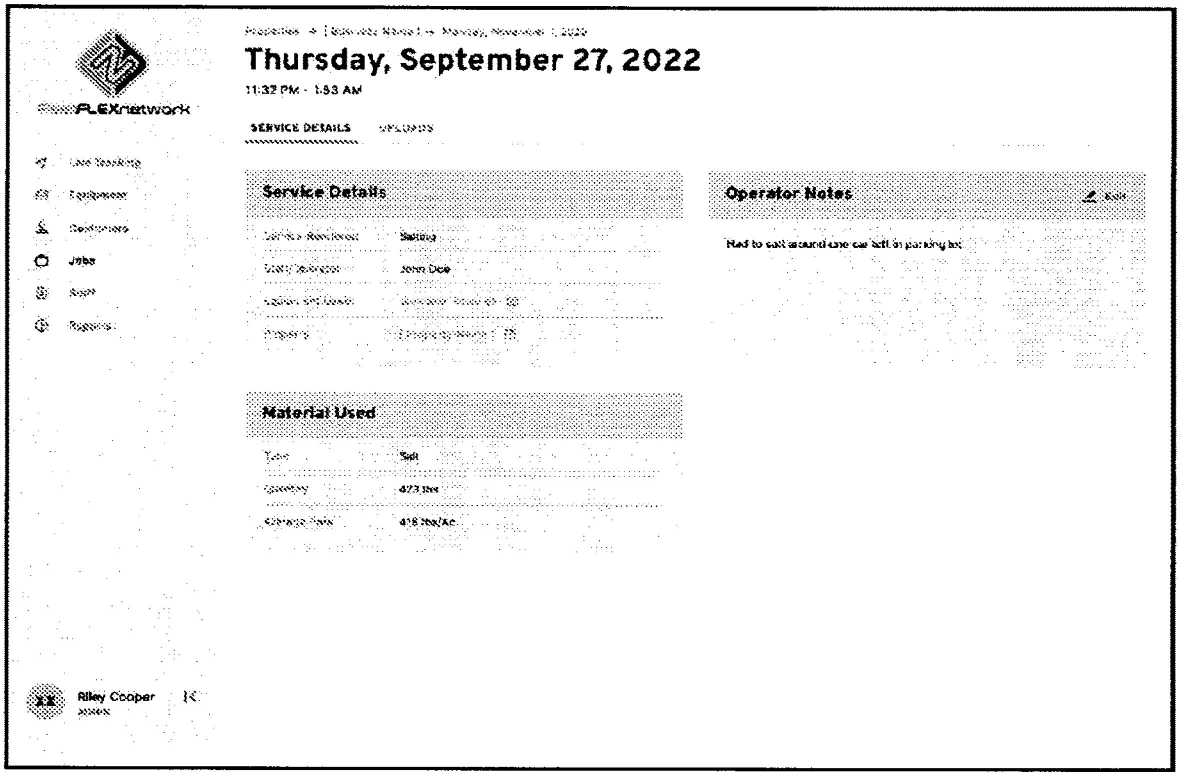
Figure 14F:
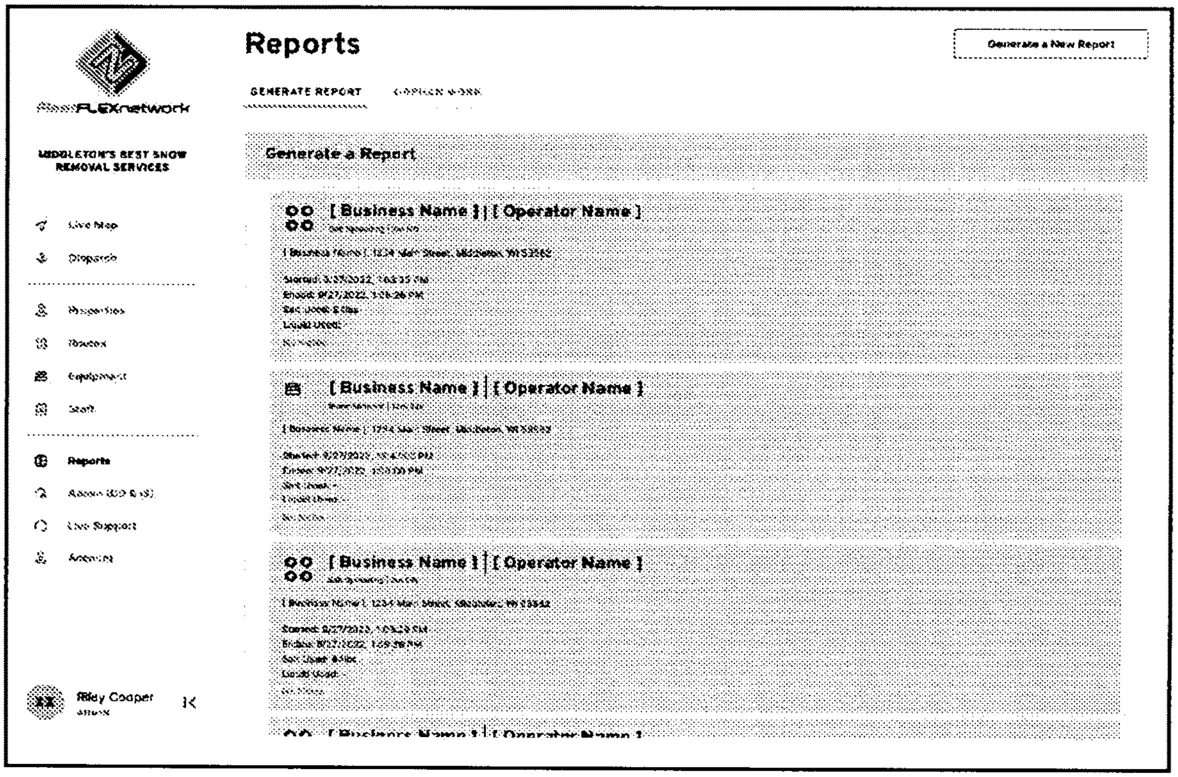

FIG. 14A shows the map view in which the locations of vehicles where work is being done can be displayed to a central dispatcher. FIG. 14B shows an alternative map view with details of particular operators and vehicles in service and their locations, current status, and product quantities remaining. FIG. 14C is an expanded display showing the real time status of the equipment in the field including operators, vehicles, product levels and status of completion of assigned routes. FIG. 14D shows a map view in which the activity of a vehicle during a prior operation (location history) is presented for the purpose of verification and audit of activity. FIG. 14E is an alternative view of detailed data relating to a service visit, including details of the operator, equipment, material use, and any notes from the service provider relating to the service provided. FIG. 14F shows a still further alternative presentation of data relating to a service visit, including all visits to a particular location and the details thereof.

Figure 18:
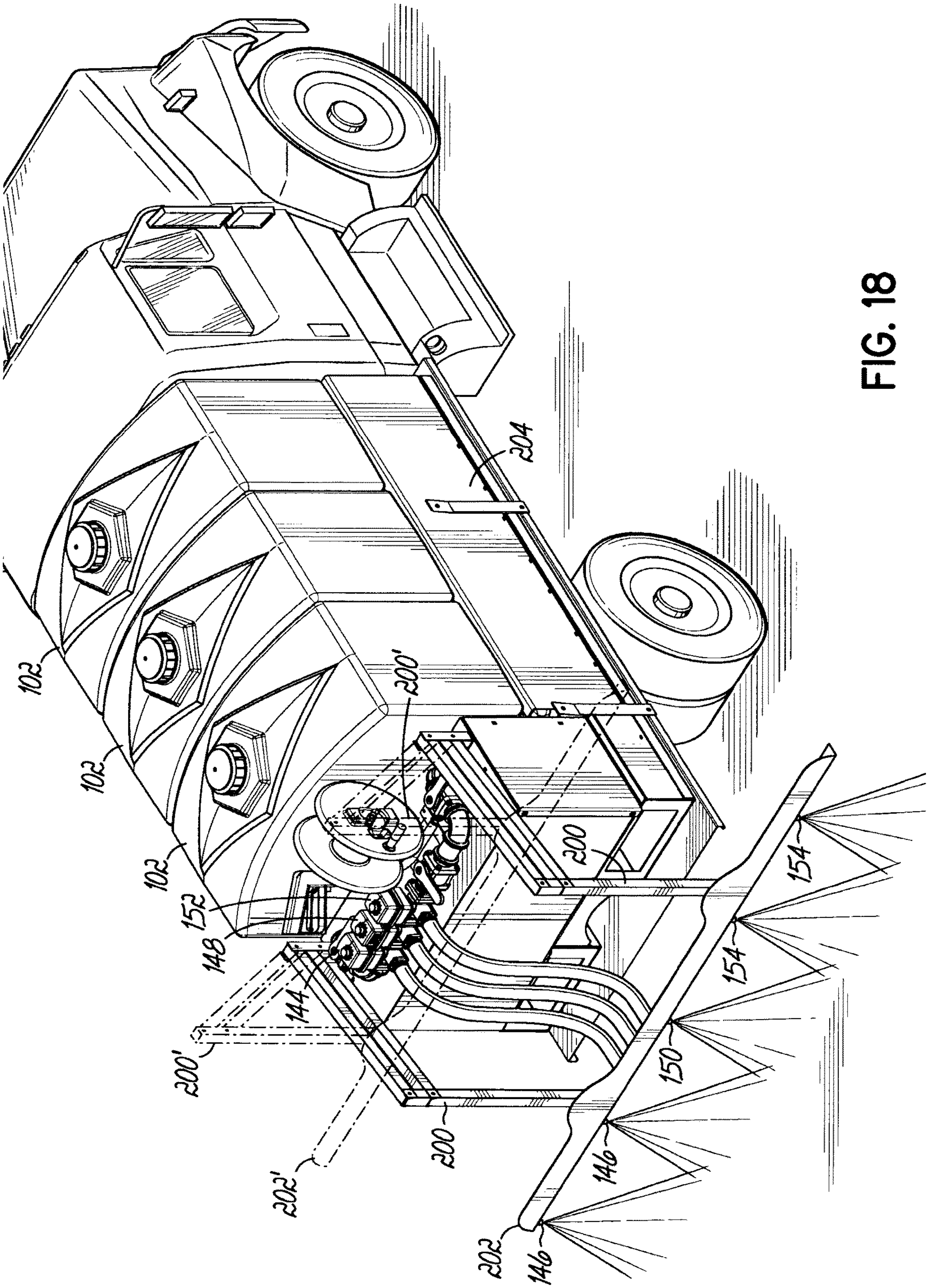
FIG. 18 is a rear quarter perspective view of a truck providing liquids delivery through a novel sprayer using a control system in accordance with principles of the present invention.

FIG. 18 illustrates a liquid spraying truck in accordance with principles of the present invention implementing the brine and hot mix spraying system illustrated schematically in FIG. 12. In this truck, three segmented main brine tanks 102 store the main brine fluid to be delivered to the treated surface. Segmentation of the tanks into three storage tanks 102 prevents liquid surge within the tanks which can destabilize the vehicle and/or alter the delivery dynamics for fluid. (Liquid surge is typically addressed with baffles such as walls, tubes or balls, positioned within a single tank.) Liquid brine and hot mix passes through check valves 124 and 140 (FIG. 12) and a mix valve 126 (FIG. 12) and then to control valves 144, 148 and 152 and then to central, passenger and driver side sprayers 150, 146 and 154, respectively.

Advantageously, sprayers 146, 150, 154 are mounted to a deployable spray bar 202, which is projected by deployable arms 200 over the road surface to the rear of the truck. As seen in FIG. 18, the deployable arms may be folded to position 200' to withdraw the spray bar to position 202' where is adjacent the rear of the truck and above the truck lift gate, permitting convenient storage.

Figure 19:
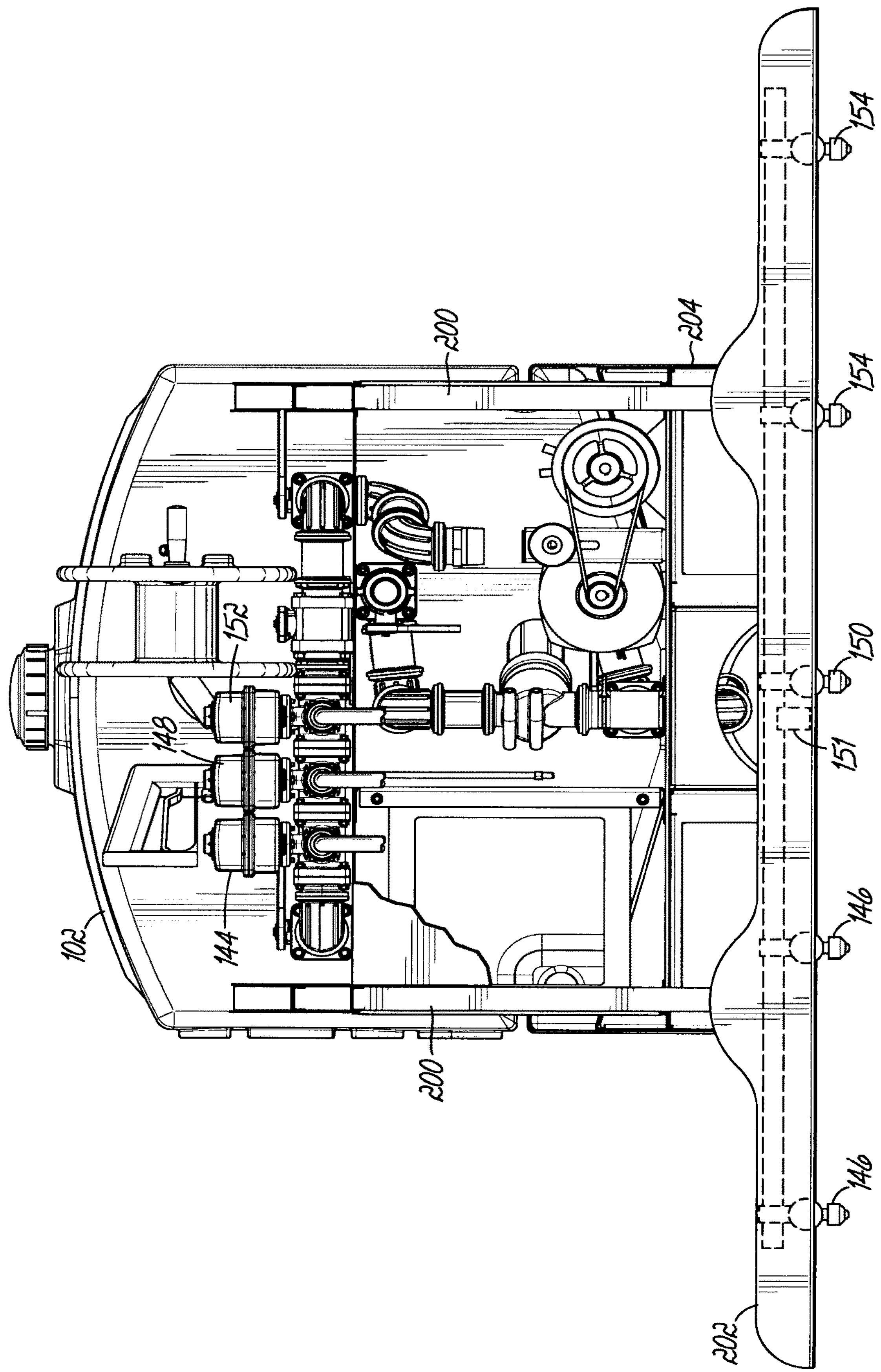
FIG. 19 is a rear view of the truck of FIG. 18 illustrating details of the spray bar.

FIG. 19 illustrates the rear of the sprayer unit, with the sprayer 202 in the lowered or deployed position 200. From this perspective, only the rearward most segmented tank 102 is visible. The specific locations of control valves 144,148 and 152 can be seen. As noted with respect to FIG. 12, these control flow to the passenger sprayer(s) 146, center sprayer (s) 150, and driver side sprayer(s) 154, respectively. Road condition sensing is performed by an optional sensor 151.

Figure 20:
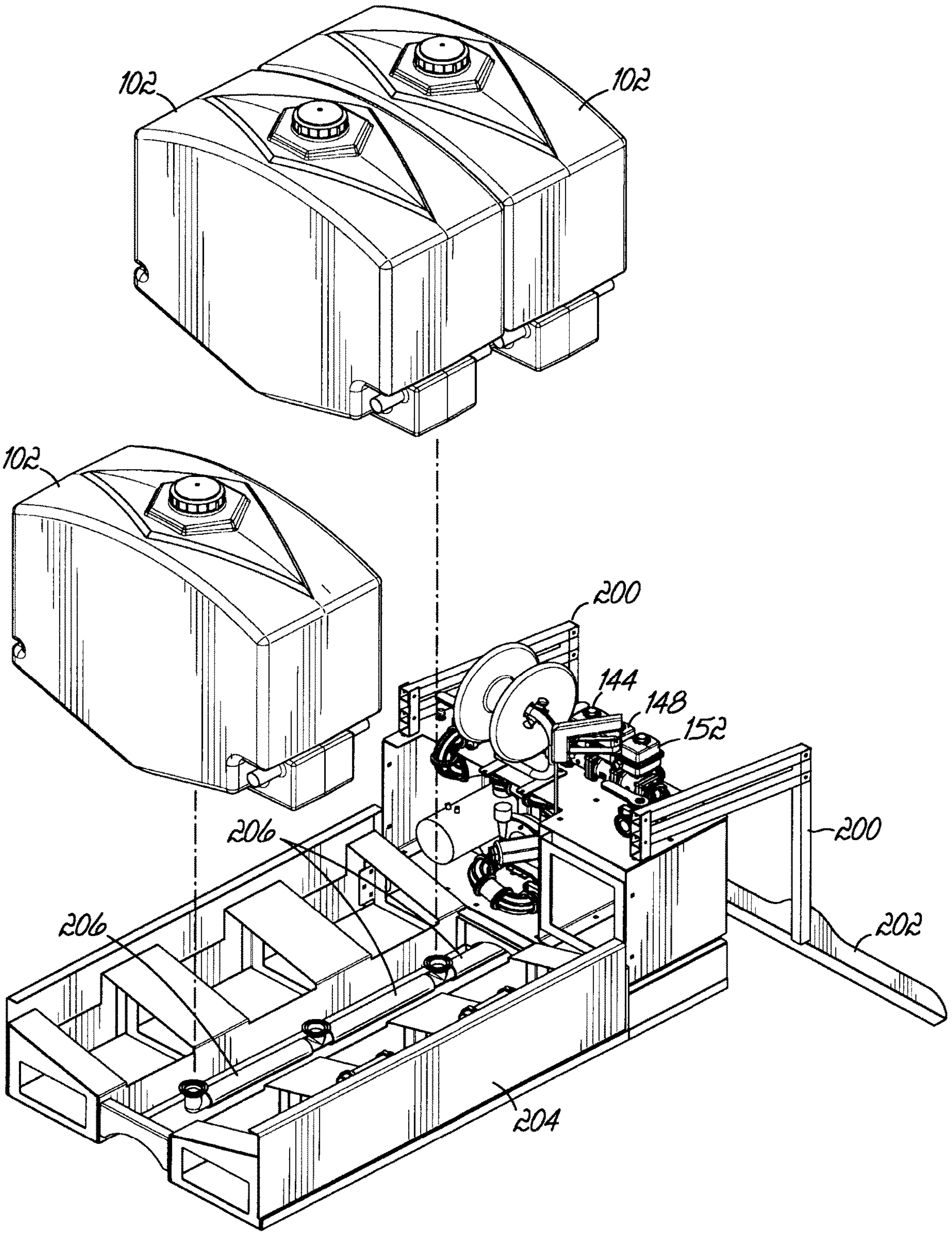
FIG. 20 is a partially disassembled front quarter perspective view of the delivery tanks and platform used with the truck shown in FIG. 18.

FIG. 20 illustrates the segmented tanks 102 and the platform 204 in greater detail. Platform 204 may be made of riveted stainless steel, and provide a flow path from each tank outlet via piping 206. Sprayer 202 is also seen in FIG. 20 in the lowered or deployed position 200.

The invention thus provides a unique and novel controller and control strategy for the delivery of material accounting for and addressing the flaws and weaknesses of existing systems and providing for a greater level of communication thereon with the operator and remote servers and managers.

The various embodiments of the invention shown and described are merely for illustrative purposes only, as the drawings and the description are not intended to restrict or limit in any way the scope of the claims. Those skilled in the art will appreciate various changes, modifications, and improvements which can be made to the invention without departing from the spirit or scope thereof.

For example, the load sensor might be implemented other than with a load cell, such as by using a short-stroke hydraulic ram coupled to a pressure transducers for bearing the weight of the hopper. Furthermore, in a more fully integrated embodiment, the load cell (or other load sensor) could be integrated into an outer structure of the hopper-spreader with the hopper and its material load cradled by the sensors. Other methods of measuring the weight of the hopper and its material load could theoretically be used as well including pneumatic systems to measure air pressure or deflection sensors to measure changes in material surfaces when loaded. On-vehicle systems might also serve as a load sensor, such as a tire pressure measurement system or rear air suspension system. Additionally, liquid material flow could be measured with a flow meter rather than a fixed-displacement pump controlled by a pulse width modulation method.

The positioning of the controller and its method of integration into the hopper/conveyor/spreader system could be implemented in numerous ways without departure from the spirit and scope of the invention. Communication to a human interface in a vehicle cab could use wireless communication, to eliminate the need for cabling a vehicle to use the system. The controller and modules may particularly use Bluetooth Low Energy (BLE) wireless links.

In some embodiments the controller may include a video input for receiving video from remote cameras, for storage or delivery locally to the human interface 56 or to a remote server via modem 54. Further, the controller may include a pavement sensor(s) 151 (see FIG. 19), such as a laser or infrared temperature sensors, for evaluating road condition and including that data in the control strategy of the controller. For example, the application rate can be adjusted based upon the current temperature, current humidity, detected amounts of ice and/or water on the pavement, and the like.

Connection of the controller to the wireless modem, human interface, or other components may utilize a dedicated communications port, or may be done on a shared CAN (controller area network) bus connection or RS-485 vehicle bus, depending upon the compatibility with existing vehicle systems and desired level of interconnection.

Connection to the OBD-II port may use a wired connection from the OBD-II port on the vehicle to the controller, or a wireless connection device such as the Vgate iCar Pro may be used to interface the available CAN status and diagnostic information to a BLE format.

Figure 15:
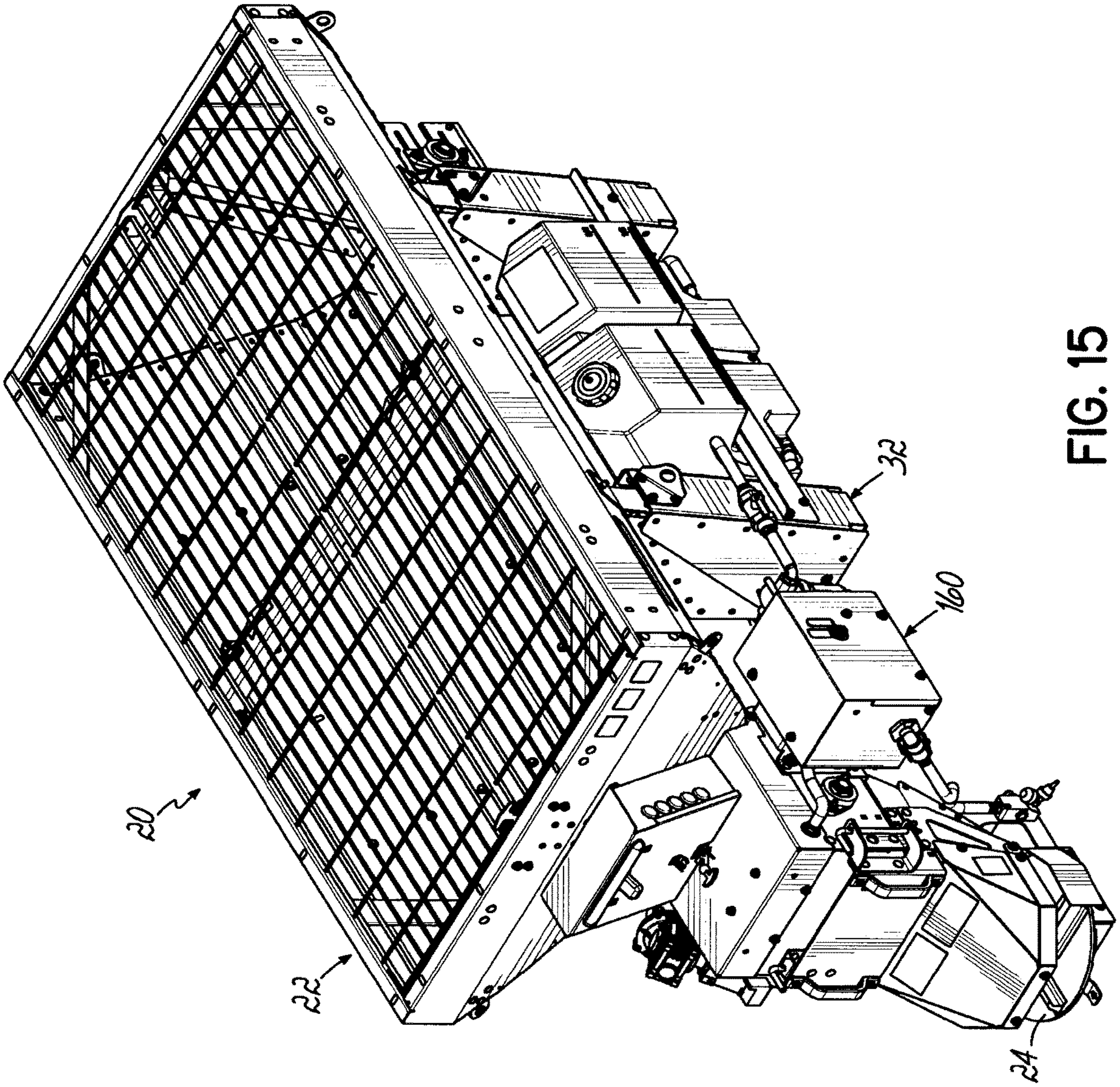
FIG. 15 illustrates a spreader in accordance with principles of the present invention when protective housings have been installed.

FIG. 15 illustrates the spreader 20 when the protective housings have been installed on hopper 22, spinner 24, and other parts of the cradle 32. FIG. 15 also shows the pre-wetting attachment 160, which is discussed in greater detail below.

Figure 16:
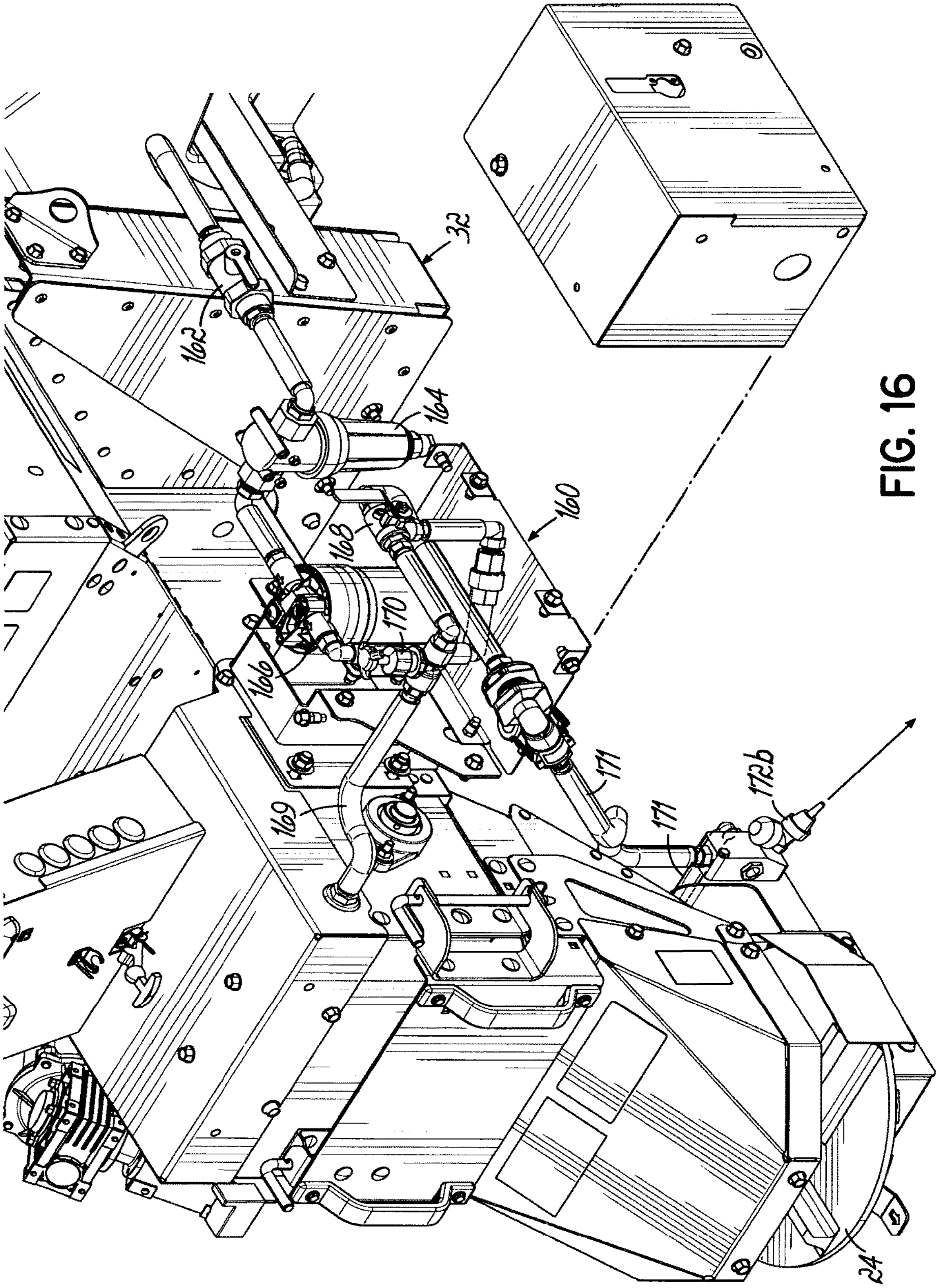
FIG. 16 illustrates the components of a pre-wetting attachment in accordance with one alternative embodiment of the invention.
Figure 17:
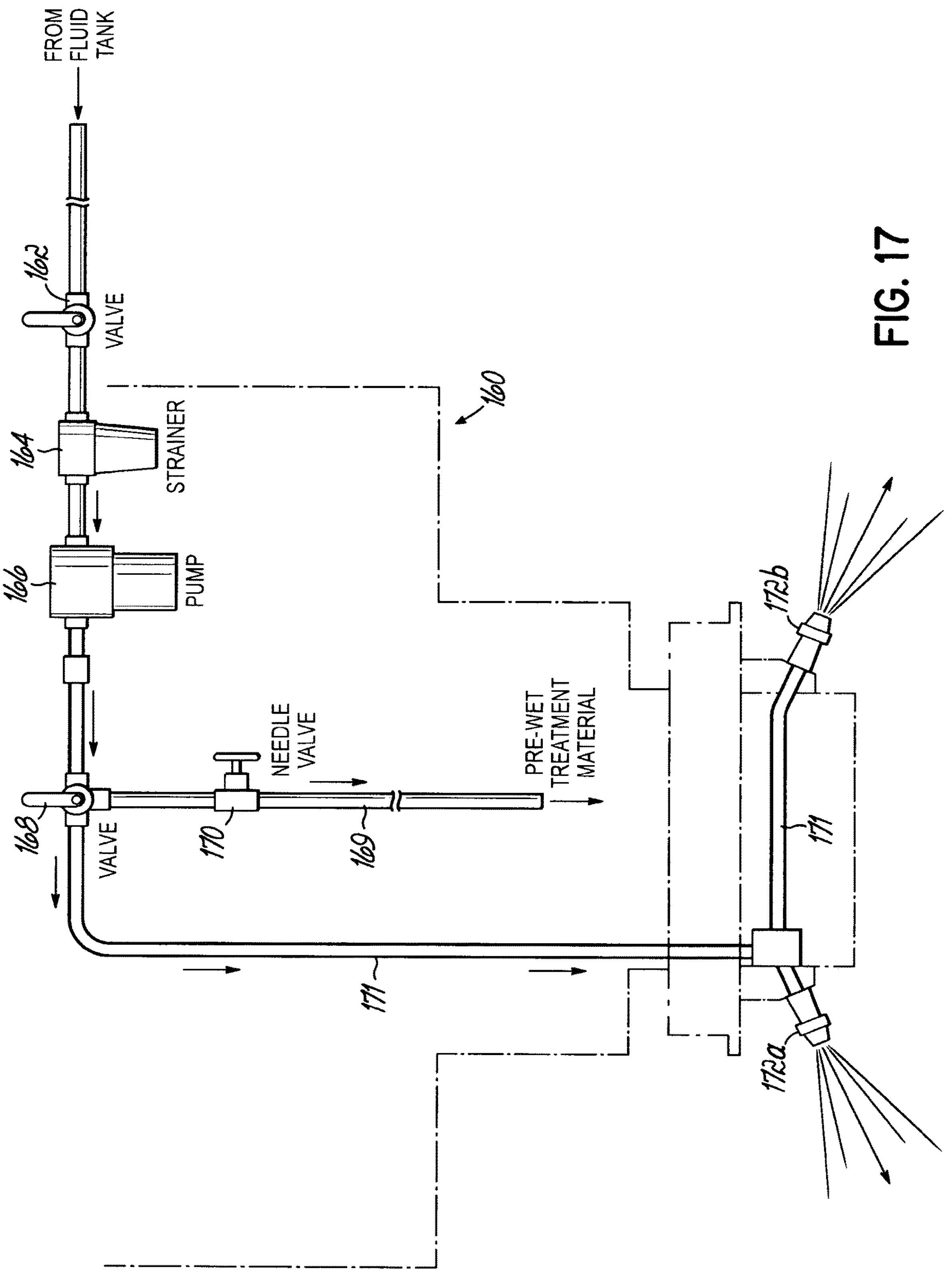
FIG. 17 is a functional diagram of components of the pre-wetting attachment seen in FIG. 16.

FIGS. 16 and 17 illustrate the components of a pre-wetting attachment. As discussed above, pre-wetting is used in snow removal to help increase the effectiveness of salt and de-icing agents. It involves applying a liquid de-icer to the road surface before or during the application of solid de-icers, such as salt.

When pre-wetting, a liquid de-icing agent, typically a salt brine solution or magnesium chloride solution, is sprayed onto the road surface before the solid de-icer is spread. This can help to activate the solid de-icer more quickly, because the liquid de-icer helps to dissolve and spread the solid material, creating a slush that can help to break down ice and snow.

Pre-wetting can be especially effective in colder temperatures, because the liquid de-icer can help to lower the freezing point of the ice and snow, making it easier to melt. In addition, because pre-wetting can help the solid de-icer to adhere to the road surface more effectively, it can reduce the amount of salt or de-icer needed to achieve the desired level of snow and ice control, which can save money and reduce environmental impacts.

As best seen in FIG. 17, the pre-wetting system comprises a ball valve 162 for controlling pre-wetting fluid flow, a strainer 164, and a pump 166 that is controlled to provide a desired amount of pre-wetting fluid. Pre-wetting fluid is directed by a T-valve two one of two places: toward the material being delivered by the spinner via needle valve 170 and piping 169, or directly to the road via piping 171 and sprayers 172*a* and 172*b*.

In use, the user rotates the ball valve 162 to allow the liquid to flow through from the tanks to the wetting system. The pump 166 receives a signal from the controller to start drawing liquid from the tanks. The liquid first goes through a strainer 164 that removes any debris that may damage the piping system before going through the pump. Liquid goes through check valve, which is designed to prevent backflow of liquid. If the liquid reverses direction or abruptly stops, the valve will close as a result to prevent damage occurring to the wetting system via water hammer. (Water hammer is a sudden pressure change in any wetting system that can lead to pump damage or hoses leaking). Liquid then flows into the 3-way T-valve 168, which will direct the liquid to either treat the material directly, or to treat the road. A user can rotate the handle of valve 168 to direct the flow to the route of their choice. If the user decides to spray the material, the liquid will first flow through a needle valve 170. The needle valve allows the user to increase or decrease the flow rate of the liquid going to the material, along with having a secondary shut off valve. If the user decides to spray the road, the liquid will flow through piping 171 to the road spray subsystem and sprayers 172*a* and 172*b* attached to the spinner chute. If the user wishes to remove the road spray system from their chute, the coupling allows the user an easy disconnection and reconnection point to attach the road spray subsystem of the wetting system.

The specifics of the computation methods used by the control system could use different methods than those disclosed above, so long as the methodology and input and output data meet the described objectives. The invention in its broader aspects is therefore not limited to the specific details and representative apparatus and methods shown and described. For example, the controlled conveyor used in conjunction with the invention may be a belt conveyor rather than, e.g., an auger or chain conveyor. Control signals such as weight information, vehicle speed, and the like may route directly to the controller, without the use of a controller area network, or may be obtained from existing on-board vehicle systems such as the OBD-2 system mentioned above. Departures may therefore be made from such details without departing from the spirit or scope of the general inventive concept. The invention resides in each individual feature described herein, alone, and in any and all combinations and subcombinations of any and all of those features. Accordingly, the scope of the invention shall be limited only by the following claims and their equivalents.

What is claimed is:

1. A vehicle mounted sprayer system for spreading liquid material, comprising:
- one or more liquid sprayers,
- a main brine liquid tank,
- a first pump pumping brine from the main brine liquid tank,
- a hot mix tank,
- a second pump pumping hot mix from the hot mix tank,
- a mix valve, coupled to the first and second pumps and the one or more liquid sprayers, and combining brine and hot mix for delivery to the one or more liquid sprayers,
- a controller coupled to the first and second pumps and controlling and measuring an amount of combined brine and hot mix delivered to the one or more liquid sprayers.

2. The vehicle mounted sprayer system of claim 1,
further comprising a flow meter measuring a flow rate of one or both of the main brine and hot mix,
wherein the controller establishes flow rates of liquid by controlling the rate of said first and second pumps and verifies liquid flow rate with said flow meter.

3. The vehicle mounted sprayer system of claim 1, further comprising a human interface, the controller providing feedback information via the human interface to an operator.

4. The vehicle mounted sprayer system of claim 3, wherein the feedback information comprises a range within which vehicle speed must be maintained to control density of liquid delivered by the one or more liquid sprayers.

5. The vehicle mounted sprayer system of claim 3,
further comprising a wireless communication system,
wherein the controller is coupled to the wireless communication system to deliver feedback information from the controller to a remote server, for access by interested persons.

6. The vehicle mounted sprayer system of claim 5, wherein the controller receives instructions from the remote server, and presents those instructions on the human interface.

7. The vehicle mounted sprayer of claim 5, wherein feedback information provided by the controller to the remote server comprises one or more of historical measurements of density of liquid delivered by the one or more liquid sprayers, vehicle speed, and liquid flow rate data.

8. The vehicle mounted sprayer of claim 1, further comprising a vehicle speed sensor, the controller coupled to the vehicle speed sensor to detect vehicle speed and relating vehicle speed to an amount of combined brine and hot mix to be delivered to the one or more liquid sprayers for a desired density of coverage.

9. The vehicle mounted sprayer of claim 1, wherein the controller is coupled to a vehicle diagnostics port of the vehicle to obtain vehicle speed information from a vehicle-integrated vehicle speed sensor.

10. The vehicle mounted sprayer of claim 1, wherein the controller further comprises a positioning system producing location and motion information, wherein the controller obtains vehicle speed information from the positioning system.

11. The vehicle mounted sprayer of claim 1, wherein the main brine liquid tank comprises two or more brine liquid tanks positioned within a platform, and collectively supplying main brine liquid to the first pump.

* * * * *